US012555017B2

(12) United States Patent
Finck et al.

(10) Patent No.: US 12,555,017 B2
(45) Date of Patent: Feb. 17, 2026

(54) COUPLING DATA QUANTUM BITS TO AUXILIARY QUANTUM BITS

(71) Applicant: International Business Machines Corporation, Armonk, NY (US)

(72) Inventors: Aaron Finck, White Plains, NY (US); John Blair, Katonah, NY (US); Oliver Dial, Yorktown Heights, NY (US)

(73) Assignee: International Business Machines Corporation, Armonk, NY (US)

(*) Notice: Subject to any disclaimer, the term of this patent is extended or adjusted under 35 U.S.C. 154(b) by 768 days.

(21) Appl. No.: 17/897,614

(22) Filed: Aug. 29, 2022

(65) Prior Publication Data

US 2024/0078460 A1 Mar. 7, 2024

(51) Int. Cl.
*G06N 10/40* (2022.01)

(52) U.S. Cl.
CPC .................................... *G06N 10/40* (2022.01)

(58) Field of Classification Search
USPC .......................................................... 716/100
See application file for complete search history.

(56) References Cited

U.S. PATENT DOCUMENTS

| | | | |
|---|---|---|---|
| 9,208,446 | B2 | 12/2015 | Pesetski et al. |
| 9,685,935 | B2 | 6/2017 | Strand et al. |
| 10,374,612 | B1 | 8/2019 | Sinclair et al. |
| 10,467,544 | B2 | 11/2019 | Filipp et al. |
| 10,572,816 | B1 | 2/2020 | Vavilov et al. |
| 10,573,685 | B1 | 2/2020 | Adiga et al. |
| 10,957,737 | B2 | 3/2021 | Adiga et al. |
| 2017/0193388 | A1 | 7/2017 | Filipp et al. |
| 2021/0182728 | A1 | 6/2021 | Neill et al. |
| 2021/0406746 | A1 | 12/2021 | Stehlik et al. |

(Continued)

FOREIGN PATENT DOCUMENTS

| | | |
|---|---|---|
| TW | 202215310 A | 4/2022 |
| WO | PCT/EP2023/072478 | 10/2023 |

OTHER PUBLICATIONS

Marius (Strongly Correlated Photonic Materials: Parametric Interractions and Ultrastrong Coupling in Circuit QED, A Dissertation Presented To The Faculty Of Princeton University In Candidacy For The Degree Of Doctor Of Philosophy, Sep. 2020).*

(Continued)

*Primary Examiner* — Brian Ngo
(74) *Attorney, Agent, or Firm* — Erik Johnson; Ryan, Mason & Lewis, LLP

(57) ABSTRACT

A device comprises a data quantum bit, a first quantum bit coupler, a second quantum bit coupler, and an auxiliary quantum bit. The first quantum bit coupler is coupled to the data quantum bit. The second quantum bit coupler is coupled to the first quantum bit coupler. The auxiliary quantum bit is coupled to the second quantum bit coupler. The first quantum bit coupler is configured to operate in a state to suppress interaction between the data quantum bit and the auxiliary quantum bit. The first quantum bit coupler and the second quantum bit coupler are each configured to operate in a respective state to enable interaction between the data quantum bit and the auxiliary quantum bit and entangle a state of the data quantum bit with a state of the auxiliary quantum bit.

25 Claims, 13 Drawing Sheets

(56) References Cited

U.S. PATENT DOCUMENTS

2021/0406750 A1 12/2021 Li et al.
2021/0408112 A1 12/2021 Finck et al.
2021/0408113 A1 12/2021 Finck et al.

OTHER PUBLICATIONS

Nikos et al. (Quantum information processing with trapped electrons and superconducting electronics, Department of Physics, University of California Berkeley, Jul. 5, 2013).*
A. Gold et al., "Entanglement Across Separate Silicon Dies in a Modular Superconducting Qubit Device," arXiv:2102.13293v2, Mar. 11, 2021, 9 pages.
P. Zhao et al., "Tunable Coupling of Widely Separated Superconducting Qubits: A Possible Application Towards a Modular Quantum Device," arXiv:2201.03184v1, Jan. 11, 2022, 6 pages.
L. Ding et al., "Microwave Activated Two-Qubit Gate for Fluxonium Qubits via a Tunable-Transmon Coupler," Bulletin of the American Physical Society, Abstract only, Mar. 14-18, 2022, 2 pages.
I. N. Moskalenko et al., "Tunable Coupling Scheme for Implementing Two-Qubit Gates on Fluxonium Qubits," Applied Physics Letters, arXiv:2107.11550v2, Sep. 26, 2021, 14 pages.
K. N. Nesterov et al., "Proposal for Entangling Gates on Fluxonium Qubits via a Two-Photon Transition," PRX Quantum vol. 2, No. 020345, Jun. 22, 2021, 15 pages.
A. D. K. Finck et al., "Suppressed Crosstalk Between Two-Junction Superconducting Qubits with Mode-Selective Exchange Coupling," Physical Review Applied, arXiv:2105.11495v2, Nov. 22, 2021, 7 pages.
H. Paik et al., "Experimental Demonstration of a Resonator-Induced Phase Gate in a Multi-Qubit Circuit QED System," Physical Review Letters, arXiv:1606.00685v1, Jun. 2, 2016, 13 pages.
Q. Ficheux et al., "Fast Logic with Slow Qubits: Microwave-Activated Controlled-Z gate on Low-Frequency Fluxoniums," Physical Review X, arXiv:2011.02634v1, Nov. 5, 2020, 17 pages.
H. S. Ku et al., "Qubit Gates Using Hyperbolic Secant Pulses," Physical Review A, arXiv:1704.00803v2, Apr. 5, 2017, 5 pages.
C. Chamberland et al., "Topological and Subsystem Codes on Low-degree Graphs with Flag Qubits," Physical Review X, vol. 10, No. 011022, Jan. 31, 2020, 19 pages.
J. M. Kreikebaum et al., "Improving Wafer-scale Josephson Junction Resistance Variation in Superconducting Quantum Coherent Circuits," Superconductor Science and Technology, vol. 33, No. 6, Apr. 29, 2020, 6 pages.
J. Stehlik et al., "Tunable Coupling Architecture for Fixed-Frequency Transmons," arXiv:2101.07746v1, Jan. 19, 2021, 7 pages.
P. Mundada et al., "Suppression of Qubit Crosstalk in a Tunable Coupling Superconducting Circuit," Physical Review Applied, arXiv: 1810.04182v2, May 31, 2019, 11 pages.
B. Foxen et al., "Demonstrating a Continuous Set of Two-Qubit Gates for Near-Term Quantum Algorithms," Physical Review Letters, vol. 125, Sep. 15, 2020, 6 pages.
J. Stehlik et al., "Tunable Coupling Architecture for Fixed-frequency Transmon Superconducting Qubits," Physical Review Letters, vol. 127, Aug. 20, 2021, 6 pages.
F. Yan et al., "A Tunable Coupling Scheme for Implementing High-fidelity Two-Qubit Gates," Physical Review Applied, arXiv:1803.09813v1, Mar. 26, 2018, 10 pages.
M. Steffen et al., "Shaped Pulses for Quantum Computing," Physical Review A, vol. 75, No. 062326, Jun. 21, 2007, 4 pages.
C. K. Andersen et al., "Entanglement Stabilization Using Ancilla-Based Parity Detection and Real-Time Feedback in Superconducting Circuits," NPJ Quantum Information, Aug. 15, 2019, pp. 1-7, vol. 5, No. 1.
B. Criger et al., "Quantum Error Correction with Mixed Ancilla Qubits," Physical Review A, arXiv:1201.1517v2, Mar. 8, 2012, 5 pages.
A. Kandala et al., "Demonstration of a High-Fidelity CNOT Gate for Fixed-Frequency Transmons with Engineered ZZ Suppression," Physical Review Letters, arXiv:2011.07050v1, Nov. 13, 2020, 10 pages.
P. Zhao et al., "Quantum Crosstalk Analysis for Simultaneous Gate Operations on Superconducting Qubits," PRX Quantum, Apr. 1, 2022, 21 pages, vol. 3, No. 020301.
P. Mell et al., "The NIST Definition of Cloud Computing," Recommendations of the National Institute of Standards and Technology, Special Publication 800-145, Sep. 2011, 7 pages.
Counterpart Taiwanese Patent Application No. 112122104, Office Action, May 6, 2024, 18 pages.

* cited by examiner

700

800
850
854
854-1
851
851-1
852
852-1
853
853-1
830
840
820-1
820-2
820-3
810-1
810-2
810-3
401-1
401-2
401-3
422
424
220-1
220-2
210

900
940
954
950
951
952
953
920-1
401-3
422
424
401-1
401-2
920-2
920-3
910-1
220-1
210
220-2
910-2
910-3

1000
1010-1
220-1
210
220-2
1020-1
401-1
422
401-3
401-2
424
1051-1
1051
1050-1
1053-1
1053
1052
1054
1054-1
1052-1
1020-2
401-3
422
401-1
424
401-2
1010-2
220-1
210
220-2
1030-1
1050-2
1030-2
1041
1044
1045
1043
1042
1040
1030-3
1050-3

1100
1110-1
1112-1
1114
1112-2
1120-1
1122-1
1124-1
1122-2
1130
1132-1
1134
1132-2
1140
1142-1
1144
1142-2
1110-2
1112-1
1114
1112-2
1120-2
1122-1
1124-2
1122-2

COUPLING DATA QUANTUM BITS TO AUXILIARY QUANTUM BITS

BACKGROUND

This disclosure relates generally to superconducting quantum computing and, in particular, superconducting quantum systems and devices that are implemented using superconducting quantum bits (qubits). A superconducting quantum computing system is implemented using circuit quantum electrodynamics (QED) devices, which utilize the quantum dynamics of electromagnetic fields in superconducting circuits, which include superconducting qubits, to generate and process quantum information. In general, superconducting qubits are electronic circuits which are implemented using components such as superconducting tunnel junctions (e.g., Josephson junctions), inductors, and/or capacitors, etc., and which behave as quantum mechanical anharmonic (non-linear) oscillators with quantized states, when cooled to cryogenic temperatures. A qubit can be effectively operated as a two-level system using a ground state and first excited state of the qubit due to the anharmonicity imparted by a non-linear inductor element (e.g., Josephson inductance) of the qubit, which allows the ground and first-excited states to be uniquely addressed at a transition frequency of the qubit, without significantly disturbing the higher-excited states of the qubit.

Various types of quantum information processing operations can be implemented using a superconducting quantum processor which comprises multiple superconducting qubits, wherein the superconducting qubits can be coherently controlled, placed into quantum superposition states (via, e.g., single-gate operations), exhibit quantum interference effects, and become entangled with one another (via, e.g., entanglement gate operations). The fidelity of quantum gate operations can be adversely impacted by unwanted crosstalk (e.g., residual static ZZ interactions) between adjacent superconducting qubits. For example, unwanted crosstalk between superconducting qubits can cause the transition frequency of one superconducting qubit to be dependent on the state of one or more neighboring superconducting qubits. As quantum processors are scaled with increasing numbers of superconducting qubits and higher integration densities, such unwanted crosstalk becomes increasingly problematic.

SUMMARY

Exemplary embodiments of the disclosure include techniques for coupling data quantum bits to auxiliary quantum bits to facilitate operations such as quantum error correction.

An exemplary embodiment includes a device which comprises a first data quantum bit, a first quantum bit coupler, a second quantum bit coupler, and an auxiliary quantum bit. The first quantum bit coupler is coupled to the first data quantum bit. The second quantum bit coupler is coupled to the first quantum bit coupler. The auxiliary quantum bit is coupled to the second quantum bit coupler. The first quantum bit coupler is configured to operate in a state to suppress interaction between the first data quantum bit and the auxiliary quantum bit. The first quantum bit coupler and the second quantum bit coupler are each configured to operate in a respective state to enable interaction between the first data quantum bit and the auxiliary quantum bit and entangle a state of the first data quantum bit with a state of the auxiliary quantum bit.

Advantageously, utilizing the first quantum bit coupler and the second quantum bit coupler to control the interaction between the data quantum bit and the auxiliary quantum bit enables suppression of crosstalk between the first data quantum bit and the auxiliary quantum bit, as well as suppression of crosstalk between the first data quantum bit and other data quantum bits that are coupled to the same auxiliary quantum bit, when at least the first quantum bit coupler is configured to operate in a given state. Furthermore, utilizing the first quantum bit coupler and the second quantum bit coupler to control the interaction between the first data quantum bit and the auxiliary quantum bit, allows for strong exchange coupling between the first data quantum bit and the auxiliary quantum bit when the first and second quantum bit couplers are each configured in respective operating states to entangle a state of the first data quantum bit with a state of the auxiliary quantum bit.

Another exemplary embodiment includes a system which comprises a quantum processor comprising an array of quantum bits, and a control system configured to generate control signals to control the quantum processor. The array of quantum bits comprises a first data quantum bit, a first quantum bit coupler, a second quantum bit coupler, and an auxiliary quantum bit. The first quantum bit coupler is coupled to the first data quantum bit and configured to operate in one of a first state and a second state in response to a first control signal applied to the first quantum bit coupler by the control system. The second quantum bit coupler is coupled to the first quantum bit coupler and configured to operate in one of a first state and a second state in response to a second control signal applied to the second quantum bit coupler by the control system. The auxiliary quantum bit is coupled to the second quantum bit coupler. The first quantum bit coupler is configured to operate in the first state to suppress interaction between the first data quantum bit and the auxiliary quantum bit. The first quantum bit coupler and the second quantum bit coupler are each configured to operate in the second state to enable interaction between the first data quantum bit and the auxiliary quantum bit and entangle a state of the first data quantum bit with a state of the auxiliary quantum bit.

In another exemplary embodiment, as may be combined with the preceding paragraphs, the first quantum bit coupler and the second quantum bit coupler each comprise a flux-tunable transmon quantum bit.

In another exemplary embodiment, as may be combined with the preceding paragraphs, the first quantum bit coupler comprises a first multimode quantum bit which comprises a first mode and a second mode, and the second quantum bit coupler comprises a second multimode quantum bit which comprises a first mode and a second mode.

In another exemplary embodiment, as may be combined with the preceding paragraphs, the first data quantum bit is capacitively coupled to the first mode of the first multimode quantum bit, the auxiliary quantum bit is capacitively coupled to the first mode of the second multimode quantum bit, the second mode of the first multimode quantum bit is capacitively coupled to the second mode of the second multimode quantum bit, the first quantum bit coupler is configured to operate in state in which the first data quantum bit is exchange-coupled to only the first mode of the first multimode quantum bit, the first quantum bit coupler is configured to operate in state in which the first data quantum bit is exchange-coupled to both the first mode and the second mode of the first multimode quantum bit, the second quantum bit coupler is configured to operate in state in which the auxiliary quantum bit is exchange-coupled to only the first mode of the second multimode quantum bit, and the second quantum bit coupler is configured to operate in state in which the auxiliary quantum bit is exchange-coupled to both the first mode and the second mode of the second multimode quantum bit.

Another exemplary embodiment includes a device which comprises a data quantum bit, a quantum bit coupler, a transmission line resonator, and an auxiliary quantum bit. The quantum bit coupler is coupled to the data quantum bit. The transmission line resonator is coupled to the quantum bit coupler. The auxiliary quantum bit is coupled to the transmission line resonator. The quantum bit coupler is configured to operate in a state to suppress interaction between the data quantum bit and the auxiliary quantum bit. The quantum bit coupler is configured to operate in a state to enable interaction between the data quantum bit and the auxiliary quantum bit, through the quantum bit coupler and the transmission line resonator, to entangle a state of the data quantum bit with a state of the auxiliary quantum bit.

Advantageously, utilizing the quantum bit coupler and the transmission line resonator to control the interaction between the data quantum bit and the auxiliary quantum bit enables suppression of crosstalk between the data quantum bit and the auxiliary quantum bit, as well as suppression of crosstalk between the data quantum bit and other data quantum bits that are coupled to the same auxiliary quantum bit, when at least the first quantum bit coupler is configured in a given operating state. The transmission line resonator allows for relatively long-range coupling of the data quantum bit and the auxiliary quantum bit. In addition, the transmission line resonator eliminates the need to couple a dedicated quantum bit coupler to the auxiliary quantum bit because the transmission line resonator has a relatively large capacitance to ground, which serves to reduce crosstalk between data quantum bits that are coupled to the same auxiliary quantum bit.

Another exemplary embodiment includes a system which comprises a quantum processor comprising an array of quantum bits, and a control system configured to generate control signals to control the quantum processor. The array of quantum bits comprises a data quantum bit, a quantum bit coupler, a transmission line resonator, and an auxiliary quantum bit. The quantum bit coupler is coupled to the data quantum bit. The transmission line resonator is coupled to the quantum bit coupler. The auxiliary quantum bit is coupled to the transmission line resonator. The quantum bit coupler is configured to operate in a state to suppress interaction between the data quantum bit and the auxiliary quantum bit. The quantum bit coupler is configured to operate in a state to enable interaction between the data quantum bit and the auxiliary quantum bit, through the quantum bit coupler and the transmission line resonator, to entangle a state of the data quantum bit with a state of the auxiliary quantum bit.

In another exemplary embodiment, as may be combined with the preceding paragraphs, the quantum bit coupler comprises a multimode quantum bit which comprises a first mode and a second mode, the data quantum bit is capacitively coupled to the first mode of the multimode quantum bit, the transmission line resonator is capacitively coupled to the second mode of the multimode quantum bit, the quantum bit coupler is configured to operate in state in which the data quantum bit is exchange-coupled to only the first mode of the multimode quantum bit, and the quantum bit coupler is configured to operate in state in which the data quantum bit is exchange-coupled to both the first mode and the second mode of the multimode quantum bit.

Another exemplary embodiment includes a method which comprises: initializing a state of an auxiliary quantum bit; placing a first quantum bit coupler, which is coupled to the auxiliary quantum bit, into an activated state; placing a second quantum bit coupler, which is coupled to a data quantum bit, into an activated state to enable interaction between the data quantum bit and the auxiliary quantum bit and entangle a state of the first data quantum bit with a state of the auxiliary quantum bit through the first and second quantum bit couplers in the activated states; placing each of the first quantum bit coupler and the second quantum bit coupler into a deactivated state; reading the state of the auxiliary quantum bit, subsequent to each of the first quantum bit coupler and the second quantum bit coupler being placed into the deactivated state; and determining a presence of a quantum error based on the readout of the auxiliary quantum bit.

Other embodiments will be described in the following detailed description of exemplary embodiments, which is to be read in conjunction with the accompanying figures.

DETAILED DESCRIPTION

Figure 1:
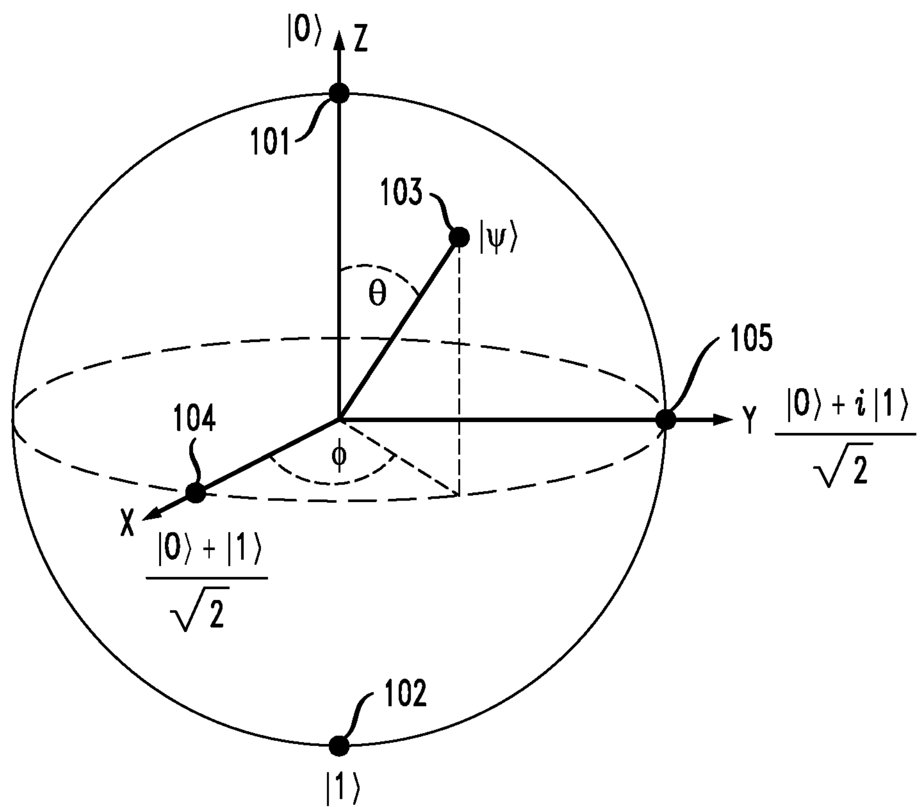
FIG. 1 depicts a Bloch sphere which graphically represents various states of a quantum bit.

Exemplary embodiments of the disclosure will now be described in further detail with regard to quantum devices which implement superconducting quantum bit couplers for coupling superconducting data quantum bits (data qubits) to superconducting auxiliary quantum bits (auxiliary qubits) to facilitate quantum operations, such as parity checks for quantum error correction, while suppressing crosstalk among the data qubits. It is to be understood that the various features shown in the accompanying drawings are schematic illustrations that are not drawn to scale. Moreover, the same or similar reference numbers are used throughout the drawings to denote the same or similar features, elements, or structures, and thus, a detailed explanation of the same or similar features, elements, or structures will not be repeated for each of the drawings. Further, the term "exemplary" as used herein means "serving as an example, instance, or illustration." Any embodiment or design described herein as "exemplary" is not to be construed as preferred or advantageous over other embodiments or designs.

Further, it is to be understood that the phrase "configured to" as used in conjunction with a circuit, structure, element, component, or the like, performing one or more functions or otherwise providing some functionality, is intended to encompass embodiments wherein the circuit, structure, element, component, or the like, is implemented in hardware, software, and/or combinations thereof, and in implementations that comprise hardware, wherein the hardware may comprise quantum circuit elements (e.g., quantum bits, coupler circuitry, etc.), discrete circuit elements (e.g., transistors, inverters, etc.), programmable elements (e.g., application specific integrated circuit (ASIC) chips, field-programmable gate array (FPGA) chips, etc.), processing devices (e.g., central processing units (CPUs), graphics processing units (GPUs), etc.), one or more integrated circuits, and/or combinations thereof. Thus, by way of example only, when a circuit, structure, element, component, etc., is defined to be configured to provide a specific functionality, it is intended to cover, but not be limited to, embodiments where the circuit, structure, element, component, etc., is comprised of elements, processing devices, and/or integrated circuits that enable it to perform the specific functionality when in an operational state (e.g., connected or otherwise deployed in a system, powered on, receiving an input, and/or producing an output), as well as cover embodiments when the circuit, structure, element, component, etc., is in a non-operational state (e.g., not connected nor otherwise deployed in a system, not powered on, not receiving an input, and/or not producing an output) or in a partial operational state.

As is known in the art, quantum computing provides a computing paradigm which utilizes fundamental principles of quantum mechanics to perform computations. Quantum computing algorithms and applications are defined using quantum circuits. A quantum circuit is a computational routine which defines coherent quantum operations that are performed on quantum data that is stored in quantum bits, in conjunction with operations that are performed using classical computation. Quantum circuits are utilized to define complex algorithms and applications in an abstract manner, which can be executed on a quantum computer. In a quantum computer, primitive operations comprise gate operations (e.g., single-qubit gate operations, two-qubit gate operations, multi-qubit gate operations (e.g., 3 or more qubits) that are applied to qubits, to perform quantum computing operations for a given application. The quantum circuits allow a quantum computer to receive classical data, perform quantum operations based on the received data, and output a classical solution.

A single qubit can have a basis state of $|0\rangle$ or $|1\rangle$, or a linear combination of such basis states, which is known as a superposition state. As is known in the art, the state of a qubit can be graphically represented as a point on unit sphere (radius=1), which is called the Bloch sphere, such as illustrated in FIG. 1. In particular, FIG. 1 illustrates an exemplary Bloch sphere 100 in which the basis states $|0\rangle$ or $|1\rangle$ of a qubit are represented along the Z-axis of the Bloch sphere 100, wherein a point 101 on the positive Z-axis represents the ground state $|0\rangle$, and a point 102 on the negative Z-axis represents a first excited state $|1\rangle$ of the qubit. A superposition state $|\psi\rangle$ of the qubit can be represented as a point on the Bloch sphere as follows:

$$|\psi\rangle = \cos\frac{\theta}{2}|0\rangle + e^{i\phi}\sin\frac{\theta}{2}|1\rangle,$$

where the terms cos θ/2 and sin θ/2 correspond to the amplitude probabilities associated with the respective states $|0\rangle$ and $|1\rangle$, and wherein the term $e^{i\phi}$ corresponds to a relative phase between the states $|0\rangle$ and $|1\rangle$. The position of a point 103 (representing a superposition state of a qubit) is determined based on the angles θ and ϕ. The angle θ influences the probability of observing a qubit state of $|0\rangle$ or $|1\rangle$ when the qubit is read, wherein the probability of reading a qubit state of $|1\rangle$ increases as θ increases. The angle ϕ influences the relative phase between the states $|0\rangle$ and $|1\rangle$. For example, when θ=0, the qubit is in the ground state $|0\rangle$, which provides a 100% probability of observing a qubit state of $|0\rangle$ when the qubit state is read. In addition, when $\theta=\pi$, the qubit is in the first excited state $|1\rangle$, which provides a 100% probability of observing a qubit state of $|1\rangle$ when the qubit state is read. On the other hand, when $$\theta = \frac{\pi}{2} \text{ and } \phi = 0,$$

the quibit is in the state at point 104, and when $$\theta = \frac{\pi}{2} \text{ and } \phi = \frac{\pi}{2},$$

the qubit is in the state at point 105. When the qubit is in a superposition state represented by, e.g., points 104 and 105, there is a 50% probability of observing a qubit state of $|1\rangle$, and a 50% probability of observing a qubit state of $|0\rangle$, when the qubit state is read.

The state of a given qubit can be changed by applying a single-qubit gate operation to the given qubit, which causes the current state of the qubit to rotate around, e.g., the X-axis, Y-axis, and/or Z-axis, etc., depending on the given gate operation. A rotation about the Z-axis results in a change in the angle $\phi$. In addition, qubits can be controlled using entanglement gate operations to entangle the states of two or more qubits and, thereby, generate a combined state of two or more qubits, which contains more information than the individual states of the qubits. In this regard, quantum computing based on qubits operates on two key principles of quantum physics: superposition and entanglement, wherein superposition essentially allows a given qubit to represent both a 1 and a 0 at the same time, and wherein entanglement allows multiple qubits in a superposition to be correlated with each other in a way that the state of one qubit can depend on the state of another qubit such that more information can be encoded with multiple entangled qubits as compared to encoding the qubits individually. Accordingly, quantum information processing, based on principles of superposition and entanglement stage of qubits, allows quantum computers to solve difficult problems that are intractable using conventional computers.

A significant challenge in the development of quantum computers is the sensitivity of the quantum states of the qubits to noise and errors. For example, a quantum system may interact with the environment in a way which causes decoherence of the qubit states. As is known in the art, quantum error correction (QEC) techniques are utilized to protect quantum information from errors due to decoherence of qubit states and other quantum noise. In general, QEC techniques are based on quantum error correction codes which store quantum information and protect a quantum state against a set of errors. In order to perform reliable quantum computing, we have to use qubits encoded in error-correction codes.

The quantum error-correcting codes are utilized to encode the quantum system into a subspace (referred to as code space) of an entire qubit space, such that the errors caused by decoherence of the quantum system can be detected and corrected based on the quantum error correction codes. In general, a quantum error correcting code provides a method of storing (or transmitting) M bits of quantum information using N qubits (where N>M) in such a way that if an arbitrary subset of the N qubits undergoes arbitrary errors, the quantum information can be recovered. For a quantum error code to properly protect a quantum state against a set of errors, the code space is selected such that each error transforms the state in such a way that enables a quantum error correction system to perform a suitable measurement to determine which error occurred without actually acquiring any information about the state of the qubits that was stored in the code, which would necessarily disturb the state of the qubits.

In the context of quantum computing, superconducting auxiliary qubits can be utilized for various purposes such as quantum error correction. The terms "superconducting auxiliary quantum bit" or "auxiliary quantum bit" generally refer to a superconducting quantum bit which is utilized to facilitate one or more quantum operations associated with one or more other superconducting quantum bits. For example, as used in conjunction with one or more illustrative embodiments, a superconducting auxiliary quantum bit is utilized to facilitate one or more error detection/correction operations associated with one or more superconducting data quantum bits.

As explained in further detail below, a superconducting auxiliary qubit is coupled to one or more superconducting data qubits using a superconducting multimode qubit coupler. The terms "superconducting data quantum bit" or "data quantum bit" as used herein refers to a superconducting quantum bit that is utilized to store computational states of a quantum system. Further, data qubits are utilized to encode logical qubits, in quantum error correction codes. In the context of quantum error correction, an auxiliary qubit is entangled with the state of multiple data qubits which encodes a logical qubit state for quantum error correction, and the state of the auxiliary qubit is directly measured and used to detect errors in the data qubits, in a quantum error code. In other words, in the context of quantum error correction, logical qubits are constructed from physical data qubits, wherein each logical qubit is encoded in number of physical data qubits which have entangled states.

A quantum error correction system utilizes auxiliary qubits to determine an error syndrome. For example, an error syndrome can be determined by a process which comprises performing a series of operations in which an auxiliary qubit is entangled with a plurality of data qubits, and then the auxiliary qubit is measured to determine if an error exists in the encoded states of the data qubits. This process allows information about the data qubits to be inferred without directly reading the data qubits, which would result in collapsing the state of the data qubits. The syndrome measurement provides information regarding the error which has occurred, but does not provide the quantum information stored in the logical qubit, since the measurement would destroy any quantum superposition of the logical qubit with other qubits in the quantum system.

Figure 2A:
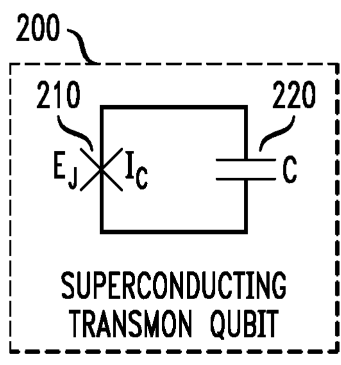
FIGS. 2A and 2B schematically illustrate a superconducting transmon quantum bit which is utilized to implement data quantum bits and auxiliary quantum bits, according to an exemplary embodiment of the disclosure.
Figure 2B:
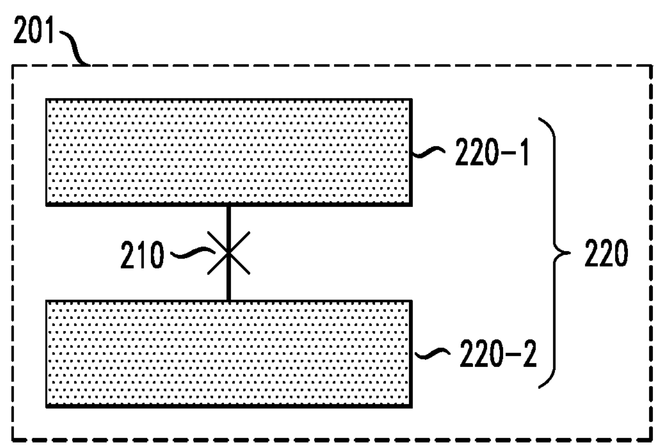

As noted above, a superconducting quantum computing system can be implemented using superconducting qubits. For example, a superconducting transmon (transmission line shunted plasma oscillation) qubit is a type of superconducting qubit comprising a superconducting tunnel junction device (e.g., Josephson junction) connected in parallel with a capacitor. FIGS. 2A and 2B schematically illustrate a superconducting transmon qubit, which can be utilized to implement data qubits and auxiliary qubits, according to an exemplary embodiment of the disclosure. More specifically, FIG. 2A is a schematic lumped-element circuit representation of a superconducting transmon qubit 200, and FIG. 2B schematically illustrates a planar circuit configuration 201 of the superconducting transmon qubit 200 of FIG. 2A, according to an exemplary embodiment of the disclosure.

As shown in FIG. 2A, the superconducting transmon qubit 200 comprises a superconducting tunnel junction device 210 and a capacitor 220 which are connected in parallel. In some embodiments, the superconducting tunnel junction device 210 is a Josephson tunnel junction device 210 having a Josephson energy $E_J$ and critical current $I_C$. The capacitor 220 comprises a capacitance C. The Josephson tunnel junction device 210 comprises a small junction capacitance which is omitted from FIG. 2A for ease of illustration. The capacitance C of the capacitor 220 is large relative to the junction capacitance of the Josephson tunnel junction device 210. The Josephson tunnel junction 210 functions as a non-linear inductor which, when shunted with the capacitor 220, forms an anharmonic LC oscillator with individually addressable energy levels (e.g., two lowest energy level corresponding to the ground state $|0\rangle$ and the first excited state $|1\rangle$).

As shown in FIG. 2B, the planar circuit configuration 201 of the superconducting transmon qubit 200 comprises a first superconducting pad 220-1, a second superconducting pad 220-2, and a Josephson tunnel junction device 210 that is coupled to, and disposed between, the first and second superconducting pads 220-1 and 220-2. The first and second superconducting pads 220-1 and 220-2 pads comprise electrodes of a coplanar parallel-plate capacitor structure which correspond to the capacitor 220 (with the capacitance C) of the superconducting transmon qubit 200.

In general, superconducting transmon qubits are commonly utilized in superconducting quantum computing systems, as transmon qubits provide good coherence times, and have relatively simple structures that facilitate coupling with other superconducting circuit elements, and qubit readout resonators, etc. To control and readout the state of a transmon qubit, one can design such structures to capacitively or inductively couple the transmon qubit to other circuit elements, including microwave and flux drive lines, readout resonators, and couplers. In addition, transmon qubits can be designed to have a relatively high anharmonic spectrum, in which the frequency separation between the computational states and the non-computational states, is relatively high, allowing efficient use of a superconducting transmon qubit as a two-level quantum system.

In particular, as is known in the art, the operating frequency (alternatively, transition frequency) of a superconducting qubit is the frequency that corresponds to a difference in the energy between the ground state $|0\rangle$ and the first excited state $|1\rangle$ of the qubit. With superconducting qubits, while higher energy levels are available for a given qubit (e.g., $|2\rangle$), $|3\rangle$, etc.), the quantum system is designed to isolate the two lowest energy levels (i.e., ground state $|1\rangle$ and first excited state $|1\rangle$ of the superconducting qubits, and thereby utilize each superconducting qubit as a basic two-level system for quantum computation, while ignoring higher energy states. The term "anharmonicity" as used herein refers to a difference between (i) the frequency ($f_{01}$) to transition from the ground state $|0\rangle$ to the first excited state $|1\rangle$ and (ii) the frequency ($f_{12}$) to transition from first excited state $|1\rangle$ to the second excited state $|2\rangle$, of the qubit.

The Josephson tunnel junction device 210 of the superconducting transmon qubit 200 can be designed to have a target critical current $I_c$ and Josephson energy $E_J$ to achieve a given anharmonicity for the qubit potential. For a Josephson tunnel junction, a resulting superconducting current I which flows through the tunnel junction, and junction voltage V across the tunnel junction, are related to the superconducting phase difference $\varphi=\varphi_1-\varphi_2$ as follows:

$$I = I_c \sin\varphi, \text{ and } V = \frac{\Phi_0 d\varphi}{2\pi dt},$$

where $I_c$ denotes the critical current of the tunnel junction, and where $\Phi_0$=h/2e. The junction critical current is determined by $$I_c = \frac{2eE_J}{h},$$

wherein the junction critical current $I_c$ denotes a maximum amount of current that can coherently tunnel through the junction (exhibiting no dissipation). The junction critical current $I_c$ is a function of the Josephson energy $E_J$ of the Josephson junction, wherein $E_j=L_jI_C^2$, wherein $L_j$ denotes the Josephson inductance of the Josephson junction. Based on the standard relation for inductance $$V = L_J\left(\frac{dI}{dt}\right),$$

the Josephson inductance $L_j$ is determined as:

$$L_J = \frac{\Phi_0}{2\pi I_c \cos\varphi},$$

which shows that $L_j$ is non-linear with respect to φ.

Figure 3A:
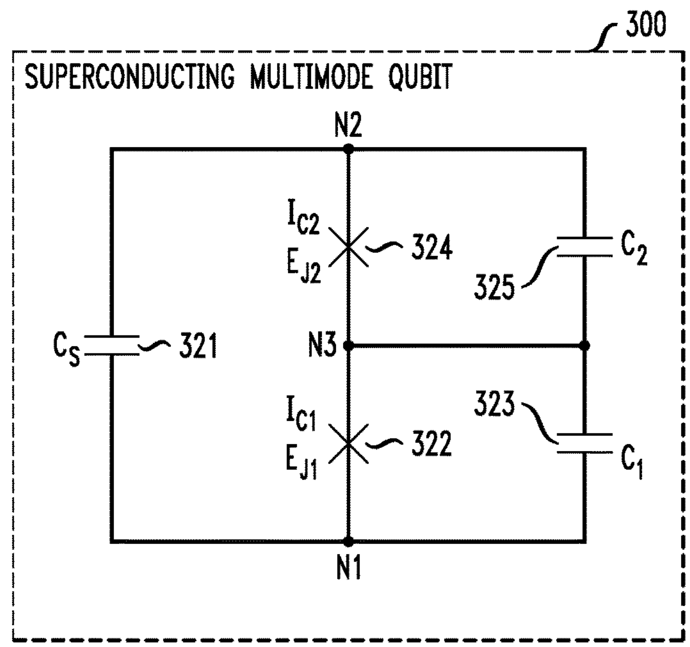
FIGS. 3A and 3B schematically illustrate a superconducting multimode quantum bit which can be configured to implement a superconducting multimode quantum bit coupler for coupling data quantum bits to auxiliary quantum bits, according to an exemplary embodiment of the disclosure.
Figure 3B:
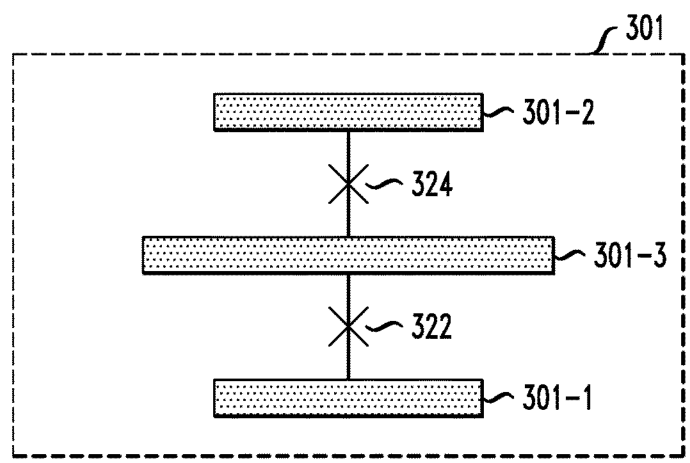

Another type of superconducting qubit that can be utilized to implement a quantum system includes a superconducting multimode qubit which comprises a multimode two-junction qubit architecture, such as schematically illustrated in FIGS. 3A and 3B. More specifically, FIG. 3A is a schematic lumped-element circuit representation of a superconducting multimode qubit 300, which is alternatively referred to as a superconducting tunable coupler qubit (TCQ). The superconducting multimode qubit 300 comprises a shunt capacitor 321, and two capacitively-shunted superconducting Josephson tunnel junctions connected in series between a first node N1 and a second node N2 of the superconducting multimode qubit 300. A first capacitively-shunted Josephson tunnel junction comprises a first Josephson tunnel junction device 322 connected in parallel with a first capacitor 323. A second capacitively-shunted Josephson tunnel junction comprises a second Josephson tunnel junction device 324 connected in parallel with a second capacitor 325. The shunt capacitor 321 has a capacitance $C_s$, the first Josephson tunnel junction device 322 has a Josephson energy $E_{J1}$, the second Josephson tunnel junction device 324 has a Josephson energy $E_{J2}$, the first capacitor 323 has a capacitance $C_1$, and the second capacitor 325 has a capacitance $C_2$. The first and second capacitively-shunted superconducting Josephson tunnel junctions are coupled to a middle node N3.

Next, FIG. 3B schematically illustrates a planar circuit configuration of the superconducting multimode qubit 300 of FIG. 3A, according to an exemplary embodiment of the disclosure. More specifically, FIG. 3B schematically illustrates a planar superconducting multimode qubit 301 comprising a first superconducting pad 301-1, a second superconducting pad 301-2, a third (middle) superconducting pad 301-3, wherein the first Josephson tunnel junction device 322 is coupled to and between the first and third superconducting pads 301-1 and 301-3, and the second Josephson tunnel junction device 324 is coupled to and between the second and third superconducting pads 301-2 and 301-3. In this configuration, the superconducting pads 301-1, 301-2, and 301-3 comprise planar capacitor electrodes which form coplanar parallel-plate capacitor structures. For example, in the exemplary configuration of FIG. 3B, the first and second superconducting pads 301-1 and 301-2 comprise planar capacitor electrodes of the shunt capacitor 321 of FIG. 3A. In addition, the first and third superconducting pads 301-1 and 301-3 comprise planar capacitor electrodes of the first capacitor 323 of FIG. 3A, and the second and third superconducting pads 301-2 and 301-3 comprise planar capacitor electrodes of the second capacitor 325 of FIG. 3A. The first, second, and third superconducting pads 301-1, 301-2, and 301-3 correspond, respectively, to the first, second, and third nodes N1, N2, and N3 in FIG. 3A.

Figure 3C:
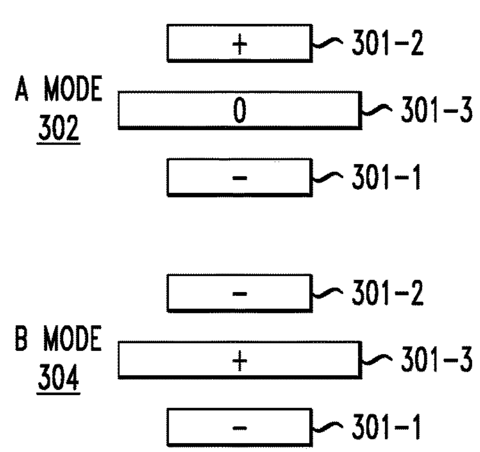
FIG. 3C schematically illustrates two distinct modes of excitations of the superconducting multimode quantum bit of FIGS. 3A and 3B, according to an exemplary embodiment of the disclosure.

The planar superconducting multimode qubit 301 comprises two modes of excitations with distinct frequencies and distinct spatial symmetries. More specifically, the planar superconducting multimode qubit 301 comprises two distinct modes of excitation corresponding to symmetric and antisymmetric combinations of excitations associated with the two junctions, wherein the two distinct, normal modes include (i) a low-frequency "bright" mode (referred to herein as A mode) which comprises a non-zero dipole moment, and (ii) a high-frequency "dark" mode (referred to herein as B mode) which lacks a dipole moment and does not couple to external fields. FIG. 3C schematically illustrates the two distinct modes of excitations of the planar superconducting multimode qubit 301 of FIG. 3B, in which the "bright" mode is depicted as an A mode 302, and the "dark" mode is depicted as a B mode 304.

As schematically shown in FIG. 3C, the A mode 302 comprises a charge pattern in which, at any given point in time, the first and second superconducting pads 301-1 and 301-2 have opposite charge, and the third (middle) superconducting pad 301-3 has a net zero charge. On the other hand, the B mode 304 comprises a charge pattern in which, at any given point in time, the first and second superconducting pads 301-1 and 301-2 have the same charge, and the third (middle) superconducting pad 301-3 has a charge that is opposite the charge on the first and second superconducting pads 301-1 and 301-2. The A and B modes have different frequencies, e.g., a mode frequency $f_B$ of the B mode 304 is greater than a mode frequency $f_A$ of the A mode 302, which allows individual excitation of one mode over the other mode.

To implement scalable quantum computing systems (e.g., a quantum processor) using superconducting qubits, it is important to minimize or eliminate crosstalk and unwanted ZZ interactions between coupled or neighboring qubits to, e.g., enable independent qubit control for high-fidelity single-qubit gate operations, and implement high-fidelity entanglement gates (e.g., two-qubit gates) between superconducting qubits. As noted above, an entanglement gate is an operation in which external fields (e.g., microwave signals) are applied to a quantum processor to create an entangled state between two or more separate qubits. For example, a controlled-phase gate (referred to herein as CPHASE gate) between two qubits is a type of entangling gate in which one qubit (e.g., target qubit) acquires a phase-shift if and only if both qubits are in their first excited state.

ZZ interaction is a type of longitudinal interaction between two qubits or modes, in which the excitation of one qubit or mode causes a shift in the transition frequency of the other qubit or mode. In certain instances, ZZ interaction provides a way to entangle two different qubits and create, e.g., a CPHASE gate, because a state-dependent shift in qubit frequency can be made equivalent to a state-dependent phase-shift. ZZ interactions are sometimes referred to as longitudinal coupling or denoted as chi or 2-chi coupling. On the other hand, in some instances, undesired ZZ interaction between two superconducting qubits is a source of crosstalk which can reduce the fidelity of gate operations.

For example, static ZZ interaction is a type of ZZ interaction that is present between two qubits or modes in the absence of any external RF drives. This "always-on" interaction comprises unwanted crosstalk, which can be detrimental to a quantum system of qubits by inhibiting independent control of each qubit and by creating unwanted entanglement. In particular, static ZZ coupling can occur between neighboring qubits, wherein the state of one qubit affects the qubit frequency of an adjacent qubit, wherein the static ZZ coupling can lead to gate errors. In this regard, static ZZ interaction is a type of unwanted crosstalk between neighboring qubits, which can adversely impact the fidelity of single-qubit gate operations, which are calibrated under the assumption that the qubit frequency is fixed.

Another source of crosstalk between neighboring qubits includes exchange interactions which occur when a microwave pulse is applied to one qubit (such as for a single-qubit gate operation), which can potentially affect another neighboring qubit if there is an exchange interaction present between such neighboring qubits. For example, if exchange interaction exists between two qubits, applying microwave pulses to one qubit can potentially excite the other qubit, which is a form of crosstalk that could be detrimental.

In the context of quantum error correction where multiple data qubits are coupled to the same auxiliary qubit, it is desirable to selectively control the interaction between the data qubits and the auxiliary bit when performing successive entanglement gate operations to entangle the auxiliary qubit with each data qubit, while suppressing crosstalk (e.g., ZZ interaction) between the data qubits. Furthermore, it is desirable to suppress crosstalk between the auxiliary qubit and the data qubits when performing a non-demolition measurement of the auxiliary qubit to determine an error syndrome without altering the state of the data qubits that are coupled to the auxiliary qubit. In this regard, exemplary embodiments of the disclosure will now be described in further detail with regard to techniques for controlling interactions between superconducting data qubits and superconducting auxiliary qubits to facilitate quantum error correction (e.g., parity checking), while suppressing crosstalk among the data qubits.

In some embodiments, superconducting multimode qubit couplers are utilized for coupling superconducting data qubits with superconducting auxiliary qubits to control exchange interactions for entangling data qubits with auxiliary qubits, while suppressing crosstalk between the superconducting data qubits. For example, in some embodiments, a flux-tunable superconducting multimode qubit coupler is implemented for coupling superconducting data qubits with superconducting auxiliary qubits. In some embodiments, a flux-tunable superconducting multimode qubit coupler is based on the multimode two-junction superconducting qubit architecture as discussed above in conjunction with FIGS. 3A-3C.

Figure 4A:
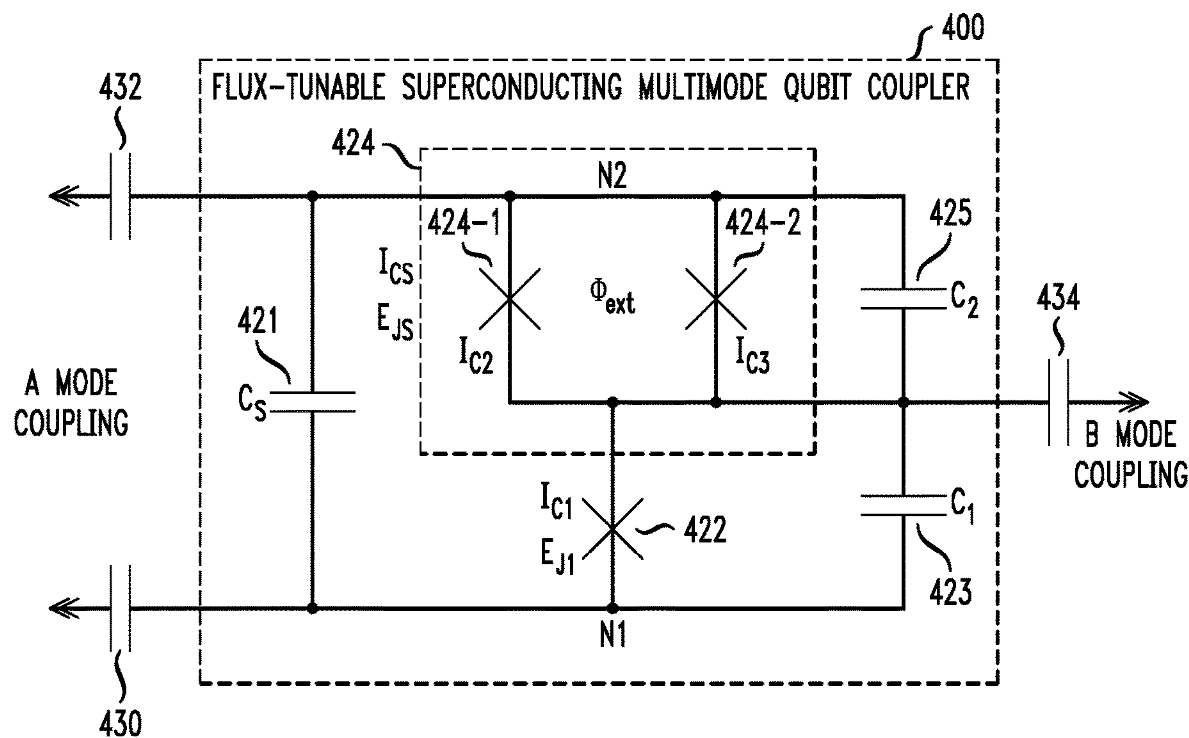
FIGS. 4A and 4B schematically illustrate a tunable superconducting multimode quantum bit coupler which is utilized for coupling superconducting data quantum bits and superconducting auxiliary quantum bits, according to an exemplary embodiment of the disclosure.
Figure 4B:
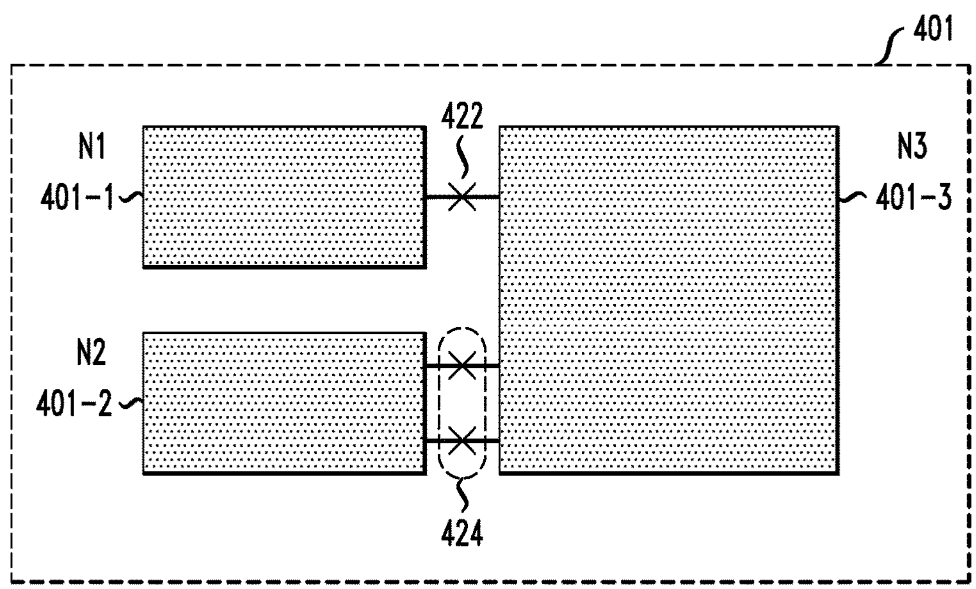

For example, FIGS. 4A and 4B schematically illustrate a tunable superconducting multimode qubit coupler which is utilized for coupling superconducting data qubits with superconducting auxiliary qubits, according to an exemplary embodiment of the disclosure. More specifically, FIG. 4A is a schematic lumped-element circuit representation of a flux-tunable superconducting multimode qubit coupler 400, and FIG. 4B schematically illustrates a planar circuit configuration 401 of the tunable superconducting multimode qubit coupler 400 of FIG. 4A, according to an exemplary embodiment of the disclosure. The tunable superconducting multimode qubit coupler 400 comprises a multimode, two-junction superconducting qubit architecture which is similar to the superconducting multimode qubit 300 (FIG. 3A), except that the superconducting multimode qubit is configured to be flux-tunable by replacing a Josephson tunnel junction device with a superconducting quantum interference device (SQUID). As explained in further detail below, the SQUID forms a superconducting loop (referred to as SQUID loop) through which an external magnetic flux can be threaded to control the interaction (e.g., facilitate exchange interaction or suppress crosstalk) between superconducting qubits that are a coupled to each other through the tunable superconducting multimode qubit coupler 400.

More specifically, as shown in FIG. 4A, the tunable superconducting multimode qubit coupler 400 comprises a shunt capacitor 421 (with capacitance $C_S$), and two capacitively-shunted superconducting Josephson tunnel junctions connected in series between a first node N1 and a second node N2 of the tunable superconducting multimode qubit coupler 400. A first capacitively-shunted Josephson tunnel junction comprises a first Josephson tunnel junction device 422 connected in parallel with a first capacitor 423 (with capacitance $C_1$). The first Josephson tunnel junction device 422 comprises a critical current of $I_{C1}$ and Josephson energy $E_{J1}$. A second capacitively-shunted Josephson tunnel junction comprises a SQUID 424 connected in parallel with a second capacitor 425 (with capacitance $C_2$). The SQUID 424 comprises a first Josephson tunnel junction device 424-1 and a second Josephson tunnel junction device 424-2, which are connected in parallel between the first node N1 and a third node N3 of the tunable superconducting multimode qubit coupler 400, and form a superconducting loop.

The SQUID 424 effectively operates as a single Josephson tunnel junction device with an effective critical current $I_{CS}$ and Josephson energy $E_{JS}$ which is tunable by applying an external magnetic field, $\Phi_{ext}$, to a superconducting loop that is formed by the parallel-connected Josephson tunnel junctions 424-1 and 424-2. In this regard, the SQUID 424 allows the tunable superconducting multimode qubit coupler 400 to be tuned through the application of a target external magnetic field $\Phi_{ext}$, which is applied by a flux-bias control line disposed in proximity to the SQUID 424, and which threads through the superconducting loop. The flux bias control line feeds a current (e.g., DC current) into an inductor element that is placed adjacent to the superconducting loop of the SQUID 424, which causes an external magnetic field $\Phi_{ext}$ to be applied to the superconducting loop of the SQUID 424. The external magnetic field $\Phi_{ext}$ modulates the critical current $I_{CS}$, and thus, the Josephson energy $E_{JS}$ of the SQUID 424 in a very specific manner.

The flux tuning of the tunable superconducting multimode qubit coupler 400 serves to control the exchange interaction (e.g., facilitate exchange interaction or suppress crosstalk) between first and second superconducting qubits that are capacitively coupled to the A mode and B mode, respectively, of the tunable superconducting multimode qubit coupler 400. In particular, as schematically illustrated in FIG. 4A, coupling capacitors 430 and 432 (connected to respective nodes N1 and N2) enable capacitive coupling of a superconducting qubit to the A mode of the tunable superconducting multimode qubit coupler 400. In addition, a coupling capacitor 434 (connected to node N3) enables capacitive coupling of a superconducting qubit to the B mode of the tunable superconducting multimode qubit coupler 400. The coupling capacitors 430, 432, and 434 can be implemented by direct capacitive coupling (via gap capacitance) or by superconducting planar transmission lines, such as coplanar waveguides.

The tunable superconducting multimode qubit coupler 400 can be tuned to operate in a first state (e.g., "OFF" state or "deactivated" state) or a second state (e.g., "ON" state or "activated" state) by changing an amount of external magnetic flux that is applied to the superconducting loop of the SQUID 424 to adjust a critical current $I_{CS}$ and, thus, adjust the Josephson energy $E_{JS}$ of the SQUID 424. For example, the tunable superconducting multimode qubit coupler 400 can be tuned to operate in a "OFF" state by applying an amount of external magnetic flux to the superconducting loop of the SQUID 424 to make the critical current $I_{CS}$ of the SQUID 424 to be equal to, or substantially equal to, the critical current $I_{C1}$ of the Josephson tunnel junction device 422, which causes a balance in the respective Josephson energies $E_{J1}$ and $E_{JS}$ of the Josephson tunnel junction device 422 and the SQUID 424.

In the "OFF" state, the tunable superconducting multimode qubit coupler 400 enforces a mode-selective coupling and creates a condition of essentially zero interaction between superconducting qubits that are capacitively coupled to the respective A and B modes. More specifically, in the "OFF" state of the tunable superconducting multimode qubit coupler 400, a superconducting qubit which is capacitively coupled to the nodes N1 and N2 of the tunable superconducting multimode qubit coupler 400 is exchanged coupled to only the A mode of the tunable superconducting multimode qubit coupler 400, and a superconducting qubit which is capacitively coupled to the node N3 of the tunable superconducting multimode qubit coupler 400 is exchanged coupled to only the B mode of the tunable superconducting multimode qubit coupler 400. In the "OFF" state of the tunable superconducting multimode qubit coupler 400, the A and B modes have distinct and separate charge patterns such as shown in FIG. 3C, which results in suppressing crosstalk (e.g., static ZZ interaction) between the superconducting qubits that are coupled by the tunable superconducting multimode qubit coupler 400.

On the other hand, the tunable superconducting multimode qubit coupler 400 can be tuned to operate in an "ON" state by applying an amount of external magnetic flux to the superconducting loop of the SQUID 424 to make the critical current $I_{CS}$ of the SQUID 424 unequal to (e.g., greater than) the critical current $I_{C1}$ of the Josephson tunnel junction device 422, which causes an imbalance in the respective Josephson energies $E_{J1}$ and $E_{JS}$ of the Josephson tunnel junction device 422 and the SQUID 424. The imbalance in the Josephson energies $E_{J1}$ and $E_{JS}$ modifies the distinct charge patterns of the A and B modes in such a way as to cause the charge patterns to become linear combinations of the distinct charge patterns shown in FIG. 3C, which disrupts the mode-selective coupling of the tunable superconducting multimode qubit coupler 400, and causes the superconducting qubits to have exchange coupling to both the A mode and the B mode of the tunable superconducting multimode qubit coupler 400. In the "ON" state of the tunable superconducting multimode qubit coupler 400, exchange coupling of both superconducting qubits to both the A mode and the B mode results in exchange coupling (e.g., ZZ interaction) between the superconducting qubits that are capacitively coupled to the A and B modes of the tunable superconducting multimode qubit coupler 400.

As schematically shown in FIG. 4B, the exemplary planar circuit configuration 401 of the tunable superconducting multimode qubit coupler 400 of FIG. 4A comprises a first superconducting pad 401-1, a second superconducting pad 401-2, and a third superconducting pad 401-3. The first and second superconducting pads 401-1 and 401-2 comprise electrodes of a coplanar parallel-plate capacitor structure which corresponds to the shunt capacitor 421 (FIG. 4A) that provides the shunt capacitance $C_S$. The Josephson tunnel junction device 422 is coupled to and between the first superconducting pad 401-1 and the third superconducting pad 401-3. The first and third superconducting pads 401-1 and 401-3 comprise electrodes of a coplanar parallel-plate capacitor structure which corresponds to the first capacitor 423 (FIG. 4A). The SQUID 424 is coupled to and between the second superconducting pad 401-2 and the third superconducting pad 401-3. The second and third superconducting pads 401-2 and 401-3 comprise electrodes of a coplanar parallel-plate capacitor structure which corresponds to the second capacitor 425 (FIG. 4A).

For purposes of illustration, exemplary embodiments of quantum systems and devices as discussed herein implement flux-tunable superconducting multimode qubit couplers based on the tunable multimode qubit framework of FIGS. 4A and 4B to control interaction between superconducting data qubits and superconducting auxiliary qubits. It is to be noted, however, that other suitable tunable multimode qubit architectures may be utilized as couplers for controlling interaction between superconducting data qubits and superconducting auxiliary qubits. Such tunable multimode qubits would implement a combination of two strongly interacting, anharmonic oscillators with a composite quantum system characterized by multiple modes of excitations that exhibit strong longitudinal couplings amongst themselves, i.e., the excitation of one mode can strongly shift the transition frequency of another mode.

Figure 5:
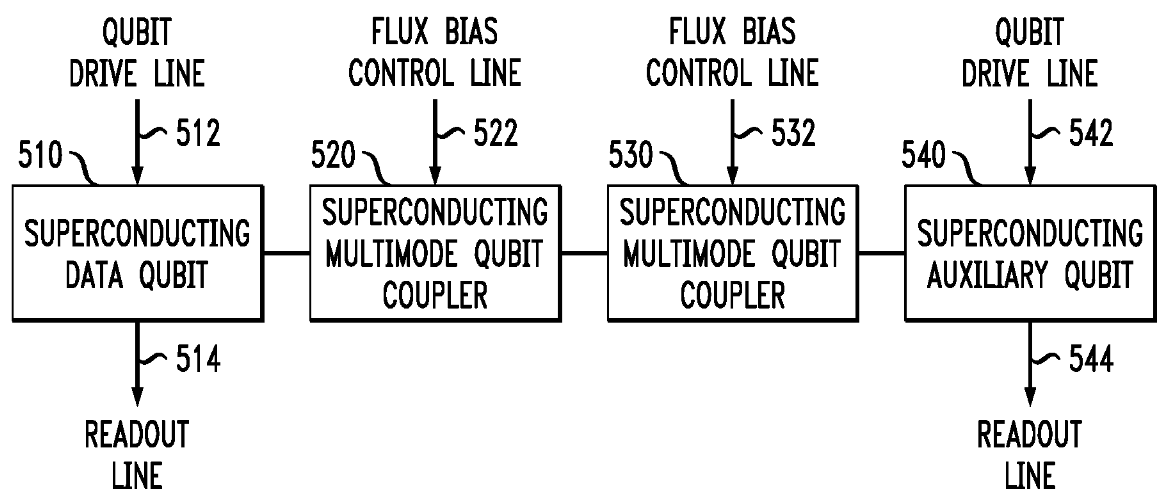
FIG. 5 schematically illustrates a quantum device comprising a superconducting data quantum bit coupled to a superconducting auxiliary quantum bit using tunable superconducting multimode quantum bit couplers, according to an exemplary embodiment of the disclosure.

FIG. 5 schematically illustrates a quantum device which comprises a superconducting data quantum bit coupled to a superconducting auxiliary quantum bit using a tunable superconducting multimode quantum bit coupler, according to an exemplary embodiment of the disclosure. In particular, FIG. 5 schematically illustrates a quantum device 500 comprising a superconducting data qubit 510, a first superconducting multimode qubit coupler 520, a second superconducting multimode qubit coupler 530, and a superconducting auxiliary qubit 540. The quantum device 500 further comprises a plurality of control lines including, but not limited to, qubit drive lines 512 and 542, qubit readout lines 514 and 544, and flux bias control lines 522 and 532.

In some embodiments, the superconducting data qubit 510 and the superconducting auxiliary qubit 540 each comprise a superconducting transmon qubit, such as shown in FIGS. 2A and 2B. In other embodiments, the superconducting data qubit 510 and the superconducting auxiliary qubit 540 can be implemented using other types of superconducting qubits such as superconducting fluxonium qubits. In some embodiments, the superconducting data qubit 510 and the superconducting auxiliary qubit 540 comprise fixed-frequency qubits (not tunable), while in other embodiments, the superconducting data qubit 510 and/or the superconducting auxiliary qubit 540 can be tunable qubits, e.g., tunable transition frequencies.

In some embodiments, the qubit drive lines 512 and 542 are coupled (e.g., capacitively coupled) to the superconducting data qubit 510 and the superconducting auxiliary qubit 540, respectively. In some embodiments, the qubit drive lines 512 and 542 are configured to apply control signals (e.g., microwave control pulse signals) to independently change the states of the respective superconducting data qubit 510 and the superconducting auxiliary qubit 540. For example, a microwave control pulse can be applied to the qubit drive line 512 to perform a single-qubit gate operation on the superconducting data qubit 510 or otherwise modify the computational state of the superconducting data qubit 510 as needed when executing a quantum algorithm. Furthermore, a microwave control pulse can be applied to the qubit drive line 542 to initialize the superconducting auxiliary qubit 540 into the ground state $|0\rangle$ at an initial phase of a quantum error correction cycle. As is known in the art, the state of a qubit can be changed by applying a microwave control signal (e.g., control pulse) with a center frequency equal to a transition frequency (denoted $f_{01}$) of the qubit, wherein the transition frequency $f_{01}$ corresponds to an energy difference between the ground state $|0\rangle$ and excited state $|1\rangle$ of the qubit. In addition, the axis of rotation about a given axis of the Bloch sphere 100 (e.g., X-axis, Y-axis, or any axis in the X-Y plane) and the amount (angle) of such rotation are based, respectively, on the phase of the microwave control signal, and the amplitude and duration of the microwave control signal.

Further, in some embodiments, the qubit readout lines 514 and 544 are coupled to the superconducting data qubit 510 and the superconducting auxiliary qubit 540, respectively, using known techniques to perform dispersive readout. In some embodiments, the qubit readout lines 514 and 544 comprise transmission line readout resonators (e.g., coplanar waveguide resonators) which are configured to have resonant frequencies that are detuned from the respective transition frequencies of the superconducting data qubit 510 and the superconducting auxiliary qubit 540. Due to the coupling of the qubit readout lines 514 and 544 to the respective superconducting data and superconducting auxiliary qubits 510 and 540, there is a shift in the resonant frequencies of transmission line readout resonators depending on the states of the respective superconducting data and superconducting auxiliary qubits 510 and 540. The change in resonant frequency of the transmission line readout resonator, which is coupled to a given qubit, is utilized to determine a readout state of the given qubit, e.g., the ground state $|0\rangle$ or first excited state $|1\rangle$, wherein for readout, superposition states of the given qubit are projected onto the ground state or the first excited state, as is known in the art.

In some embodiments, the first and second superconducting multimode qubit couplers 520 and 530 each comprise a flux-tunable superconducting multimode qubit coupler, such as described above in conjunction with FIGS. 4A and 4B. As noted above, the tunable superconducting multimode qubit coupler 400 (FIG. 4A) comprises two distinct normal modes of excitation (e.g., distinct A and B modes of excitations with distinct frequencies and spatial symmetries, as shown in FIG. 3C). The flux bias control lines 522 and 532 are utilized to apply flux bias control signals to the respective first and second superconducting multimode qubit couplers 520 and 530 to control (enforce or disrupt) the mode-selective exchange coupling between the superconducting data qubit 510 and the first superconducting multimode qubit coupler 520, between first and second superconducting multimode qubit couplers 520 and 530, and between the superconducting auxiliary qubit 540 and the second superconducting multimode qubit coupler 530 as needed, depending on the given operation.

More specifically, in some embodiments, the superconducting data qubit 510 is capacitively coupled to a first mode (e.g., A mode) of the first superconducting multimode qubit coupler 520, and the superconducting auxiliary qubit 540 is capacitively coupled to a first mode (e.g., A mode) of the second superconducting multimode qubit coupler 530. Further, a second mode (e.g., B mode) of the first superconducting multimode qubit coupler 520 is capacitively coupled to a second mode (e.g., B mode) of the second superconducting multimode qubit coupler 530. The first and second superconducting multimode qubit couplers 520 and 530 are configured to mediate interaction (e.g., ZZ interaction) with the superconducting data qubit 510 and the superconducting auxiliary qubit 540, respectively, and between the superconducting data qubit 510 and the superconducting auxiliary qubit 540, for different modes of operation.

Advantageously, mediating the coupling between the superconducting data qubit 510 and the superconducting auxiliary qubit 540 through the superconducting multimode qubit couplers 520 and 530, each of which comprising two distinct modes of excitation, allows for the simultaneous suppression of both static ZZ interactions and exchange interactions between the superconducting data qubit 510 and the superconducting auxiliary qubit 540 in instances where at least one of the superconducting multimode qubit couplers 520 and 530 is in an OFF state. The superconducting multimode qubit couplers 520 and 530 can be flux-tuned to be in an OFF state to enforce a mode-selective exchange coupling in which the superconducting data qubit 510 is exchange-coupled to only the first mode (A mode) of the first superconducting multimode qubit coupler 520, and the superconducting auxiliary qubit 540 is exchange-coupled to only the first mode (A mode) of the second superconducting multimode qubit coupler 530. In this configuration despite the capacitive coupling of the second modes (B modes) of the first and second superconducting multimode qubit couplers 520 and 530, there is substantially zero interaction between the superconducting data qubit 510 and the superconducting auxiliary qubit 540.

Figure 6:
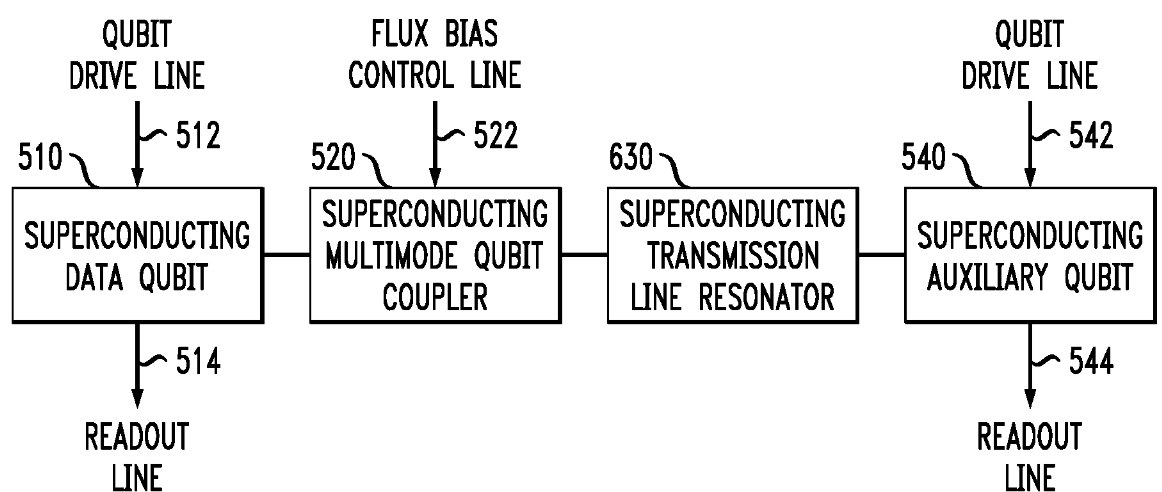
FIG. 6 schematically illustrates a quantum device comprising a superconducting data quantum bit coupled to a superconducting auxiliary quantum bit using a tunable superconducting multimode quantum bit coupler and superconducting transmission line resonator, according to an exemplary embodiment of the disclosure.

FIG. 6 schematically illustrates a quantum device comprising a superconducting data quantum bit coupled to a superconducting auxiliary quantum bit using a tunable superconducting multimode quantum bit coupler and superconducting transmission line resonator, according to an exemplary embodiment of the disclosure. In particular, FIG. 6 schematically illustrates a quantum device 600 which is similar to the quantum device 500 of FIG. 5, except that the first superconducting multimode qubit coupler 520 is coupled to the superconducting auxiliary qubit 540 by a superconducting transmission line resonator 630 (instead of the second superconducting multimode qubit coupler 530 as in FIG. 5). This configuration can be utilized for long-range coupling in instances where the superconducting auxiliary qubit 540 is disposed relatively far away from the superconducting data qubit 510. Advantageously, the superconducting transmission line resonator 630 eliminates the need to utilize a dedicated superconducting multimode qubit coupler (e.g., second superconducting multimode qubit coupler 530) for the superconducting auxiliary qubit 540 because the superconducting transmission line resonator 630 serves to reduce crosstalk between the superconducting data qubit 510 and other superconducting data qubits that are coupled to the same superconducting auxiliary qubit 540. In particular, the superconducting transmission line resonator 630 has a relatively large capacitance to ground, which acts as a divider that reduces ZZ coupling among the superconducting data qubits that are coupled to the same superconducting auxiliary qubit.

In some embodiments, the superconducting transmission line resonator 630 comprises a coplanar waveguide resonator having a given resonant frequency which is selected (e.g., detuned) based on the transition frequencies of the superconducting data qubit 510 and the superconducting auxiliary qubit 540. In some embodiments, a first end of the superconducting transmission line resonator 630 is capacitively coupled to the B mode of the superconducting multimode qubit coupler 520, and a second end of the superconducting transmission line resonator 630 is capacitively coupled directed to the superconducting auxiliary qubit 540.

Figure 7A:
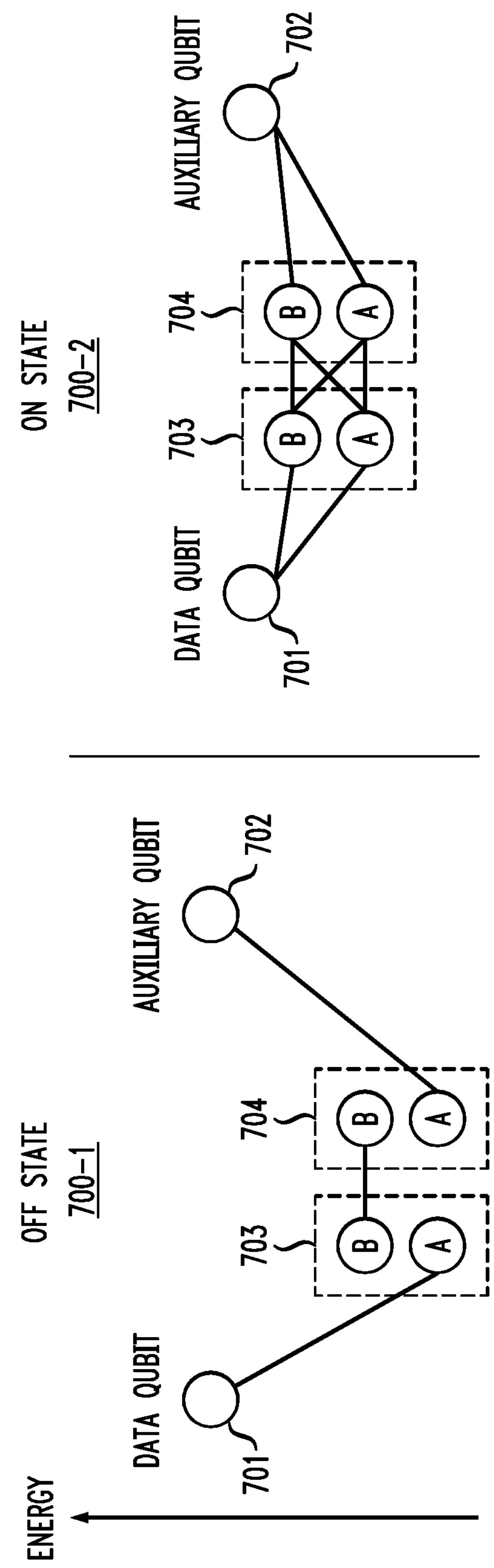
FIG. 7A schematically illustrates a method for utilizing tunable superconducting multimode quantum bit couplers to control interaction between a superconducting data quantum bit and a superconducting auxiliary quantum bit, according to an exemplary embodiment of the disclosure.

FIG. 7A schematically illustrates a method for utilizing tunable superconducting multimode quantum bit couplers to control interaction between a superconducting data quantum bit and a superconducting auxiliary quantum bit, according to an exemplary embodiment of the disclosure. In particular, FIG. 7A schematically illustrates a process 700 for controlling the interaction between a data qubit 701 and an auxiliary qubit 702 by utilizing first and second tunable superconducting multimode qubit couplers 703 and 704 (similar to the coupling configuration of the quantum device 500 of FIG. 5). As schematically illustrated in FIG. 7A, when both of the first and second tunable superconducting multimode qubit couplers 703 and 704 are flux-tuned in an OFF state 700-1, the superconducting data qubit 701 has exchange coupling with only the A mode of the first tunable superconducting multimode qubit coupler 703, and the superconducting auxiliary qubit 702 has exchange coupling with only the A mode of the second tunable superconducting multimode qubit coupler 704. Further, the B modes of the first and second tunable superconducting multimode qubit couplers 703 and 704 are exchanged-coupled to each other. In the OFF state 700-1, there is substantially no interaction (static ZZ or exchange interaction) between the superconducting data qubit 701 and the superconducting auxiliary qubit 702.

On the other hand, as schematically shown in FIG. 7A, when both of the first and second tunable superconducting multimode qubit couplers 703 and 704 are flux-tuned in an "ON" state 700-2, the superconducting data qubit 701 has exchange coupling with both the A mode and the B mode of the first tunable superconducting multimode qubit coupler 703, and the superconducting auxiliary qubit 702 has exchange coupling with both the A mode and the B mode of the second tunable superconducting multimode qubit coupler 704. Further, the B mode of first tunable superconducting multimode qubit coupler 703 has exchange coupling with both the A mode and the B mode of the second tunable superconducting multimode qubit coupler 704, and likewise, the B mode of second tunable superconducting multimode qubit coupler 704 has exchange coupling with both the B mode and A mode of the first tunable superconducting multimode qubit coupler 703. In addition, the A mode of the first tunable superconducting multimode coupler 703 has exchange coupling with the A mode and the B mode of the second tunable superconducting multimode qubit coupler 704, and vice versa. In the ON state 700-2, there is substantial exchange interaction between the superconducting data qubit 701 and the superconducting auxiliary qubit 702.

It is to be noted that FIG. 7A schematically illustrates different energy levels (e.g., frequencies) of the superconducting data qubit 701, the superconducting auxiliary qubit 702, and the A modes and the B modes of the first and second tunable superconducting multimode qubit couplers 703 and 704. In an exemplary non-limiting embodiment, the superconducting data qubit 701 is configured to have a transition frequency $f_{Q1}$, and the superconducting auxiliary qubit 702 is configured to have a transition frequency $fQ_2$, which is detuned from the transition frequency $f_{Q1}$. Furthermore, in some embodiments, in the OFF states, the first and second tunable superconducting multimode qubit couplers 703 and 704 are configured to have respective normal A and B modes with a normal A mode frequency ($f_A$) and a normal B mode frequency ($f_B$), respectively, which are detuned by a desired amount. As schematically illustrated in FIG. 7A, the normal A mode frequencies ($f_A$) and the normal B mode frequencies ($f_B$) of the first and second tunable superconducting multimode qubit couplers 703 and 704 are less than the transition frequencies of the superconducting data qubit 701 and the superconducting auxiliary qubit 702. In addition, the normal A mode frequencies ($f_A$) are less than the normal B mode frequencies ($f_B$) of the first and second tunable superconducting multimode qubit couplers 703 and 704.

Furthermore, as schematically illustrated in FIG. 7A, when the first and second tunable superconducting multimode qubit couplers 703 and 704 are both flux-tuned in the "ON" state 700-2, the energies (frequencies) of the A and B modes of the first and second tunable superconducting multimode qubit couplers 703 and 704 increase closer to the transition frequencies of the superconducting data qubit 701 and the superconducting auxiliary qubit 702. This results in disruption of the mode-selective coupling due to transformation of the charge patterns of the A and B modes in which the B mode develops a net dipole moment (and is no longer in full "dark" mode). This transformation of the A and B modes (e.g., increase in mode frequencies, change in charge patterns, etc.) causes the superconducting data qubit 701 and the superconducting auxiliary qubit 702 to have exchange coupling with both the A and B modes of the respective first and second tunable superconducting multimode qubit couplers 703 and 704, which enables and mediates the ZZ interaction between the superconducting data qubit 701 and the superconducting auxiliary qubit 702 to entangle the state of the superconducting data qubit 701 with the state of the superconducting auxiliary qubit 702.

It is to be noted that in other embodiments, the mode coupling of the superconducting data qubit 701 and the superconducting auxiliary qubit 702 to the respective first and second tunable superconducting multimode qubit couplers 703 and 704 can be implemented differently, wherein the superconducting data qubit 701 and the superconducting auxiliary qubit 702 are capacitively coupled to the B modes of the respective first and second tunable superconducting multimode qubit couplers 703 and 704, and wherein the A modes of the first and second tunable superconducting multimode qubit couplers 703 and 704 are capacitively coupled. In such configuration, in the OFF states of the first and second tunable superconducting multimode qubit couplers 703 and 704, the mode-selective coupling is enforced such that the superconducting data qubit 701 has exchange coupling to only the B mode of the first superconducting multimode qubit coupler 703, and the superconducting auxiliary qubit 702 has exchange coupling to only the B mode of the second superconducting multimode qubit coupler 704. Depending on the given mode coupling configuration, the coupling capacitances of the superconducting data qubit 701 and the superconducting auxiliary qubit 702 to the respective first and second tunable superconducting multimode qubit couplers 703 and 704 can be fine-tuned to achieve sufficient exchange coupling for the given mode coupling configuration.

Figure 7B:
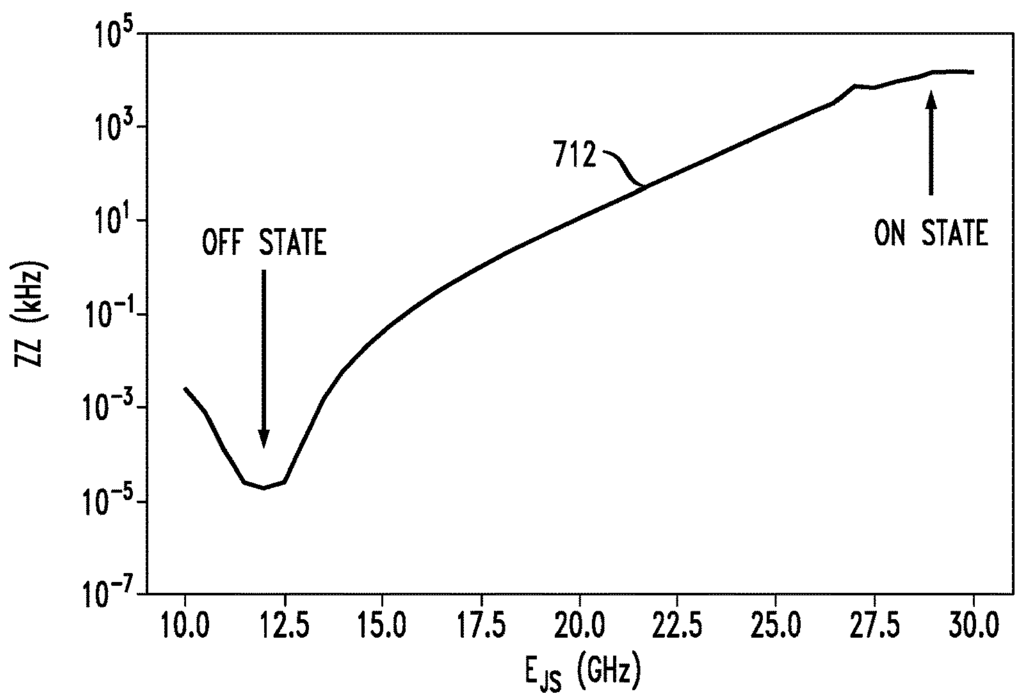
FIGS. 7B and 7C graphically illustrate methods for utilizing tunable superconducting multimode quantum bit couplers to control interaction between a superconducting data quantum bit and a superconducting auxiliary quantum bit, according to exemplary embodiments of the disclosure.
Figure 7C:
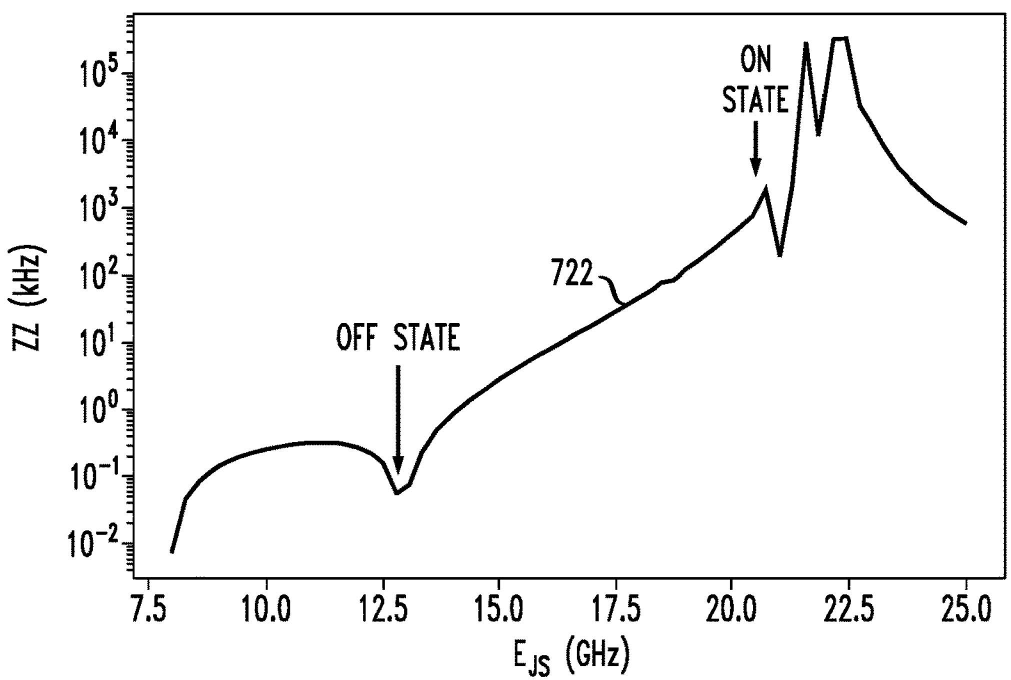

FIGS. 7B and 7C graphically illustrate methods for utilizing tunable superconducting multimode quantum bit couplers to control interaction between a superconducting data quantum bit and a superconducting auxiliary quantum bit, according to exemplary embodiments of the disclosure. The graphical illustrations in FIGS. 7B and 7C are based on computer simulations which illustrate exchange interaction (e.g., ZZ interaction) characteristics for a quantum system such as shown in FIG. 5 and a quantum system such as shown in FIG. 6, respectively.

In particular, FIG. 7B depicts a graph 710 showing an amount of ZZ interaction (Y-axis) between a superconducting transmon data qubit and a superconducting transmon auxiliary qubit which are coupled through first and second superconducting multimode qubit couplers (configuration as shown in FIG. 5) as a function of the Josephson energies $E_{JS}$ (X-axis) of the SQUIDs of the first and second superconducting multimode qubit couplers. More specially, FIG. 7B shows a curve 712 which depicts an amount of static ZZ interaction between the superconducting transmon data qubit and the superconducting transmon auxiliary qubit, where the first and second superconducting multimode qubit couplers are flux-tuned over a range of SQUID Josephson energies $E_{JS}$ from about 10 GHz to about 30 GHz. In the simulation of FIG. 7B, the first and second superconducting multimode qubit couplers were modeled with the same or similar operating parameters, and the Josephson energies $E_{JS}$ of the SQUIDs of the first and second superconducting multimode qubit couplers were varied simultaneously and maintained identical or nearly identical to each other over the energy range shown in FIG. 7B.

The curve 712 illustrates an amount of ZZ interaction between the superconducting transmon data qubit and the superconducting transmon auxiliary qubit with the superconducting multimode qubit couplers flux-tuned tuned at different states, e.g., ON state and OFF state. As shown in FIG. 7B, in the OFF state, there is essentially no ZZ coupling between the superconducting transmon data qubit and the superconducting transmon auxiliary qubit (e.g., the ZZ interaction is close to $1\times10^{-5}$ kHz). Furthermore, in the ON state, there is a relatively large amount of ZZ interaction between the superconducting transmon data qubit and the superconducting transmon auxiliary qubit (e.g., close to $1\times10^{4}$ kHz).

Next, FIG. 7C depicts a graph 720 showing an amount of ZZ interaction (Y-axis) between a superconducting transmon data qubit and a superconducting transmon auxiliary qubit which are coupled through a single superconducting multimode qubit coupler and a superconducting transmission line resonator (configuration as shown in FIG. 6) as a function of the Josephson energy $E_{JS}$ (X-axis) of the SQUID of the superconducting multimode qubit coupler. More specially, FIG. 7C shows a curve 722 which depicts an amount of ZZ interaction between the superconducting transmon data qubit and the superconducting transmon auxiliary qubit with the superconducting multimode qubit coupler flux-tuned over a range of SQUID Josephson energies $E_{JS}$ from about 7.5 GHz to about 25 GHz. The curve 722 illustrates an amount of ZZ interaction between the superconducting transmon data qubit and the superconducting transmon auxiliary qubit with the superconducting multimode qubit coupler flux-tuned tuned at different states, e.g., ON state and OFF state. As shown in FIG. 7C, in the OFF state, there is a relatively low amount of ZZ coupling between the superconducting transmon data qubit and the superconducting transmon auxiliary qubit (e.g., close to $1\times10^{-1}$ kHz). Furthermore, in the ON state, there is a relatively large amount of ZZ coupling between the superconducting transmon data qubit and the superconducting transmon auxiliary qubit (e.g., close to $1\times10^{-3}$ kHz).

While FIGS. 5 and 6 schematically illustrate quantum devices 500 and 600 comprising one superconducting data qubit coupled to one superconducting auxiliary qubit, it is to be understood that a superconducting quantum device, such as a quantum processor, can be implemented using an array of superconducting qubits comprising tens, hundreds, thousands or more superconducting qubits including data qubits and auxiliary qubits, which are coupled together using techniques as discussed herein to facilitate error correction and suppress crosstalk, depending on the application. For example, FIG. 8 schematically illustrates a quantum device which comprises an array of superconducting quantum bits comprising superconducting data quantum bits that are coupled to a superconducting auxiliary quantum bit using superconducting quantum bit couplers, according to an exemplary embodiment of the disclosure.

Figure 8:
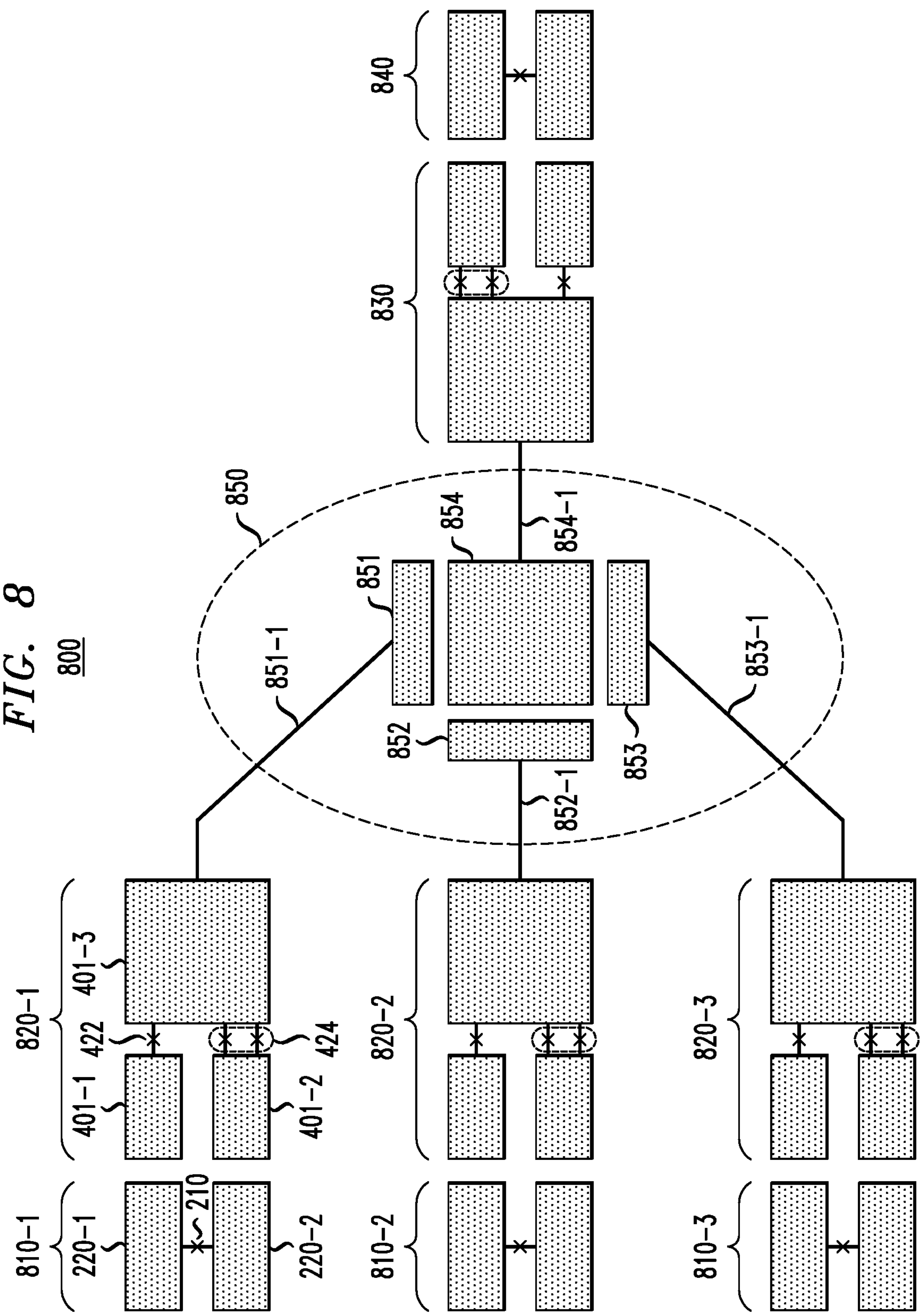
FIG. 8 schematically illustrates a quantum device which comprises an array of superconducting quantum bits comprising superconducting data quantum bits that are coupled to a superconducting auxiliary quantum bit using superconducting quantum bit couplers, according to an exemplary embodiment of the disclosure.

In particular, FIG. 8 schematically illustrates a quantum device which comprises a superconducting quantum bit array 800 comprising superconducting data qubits 810-1, 810-2, and 810-3, and tunable superconducting multimode qubit couplers 820-1, 820-2, and 820-3, which are capacitively coupled to the superconducting data qubits 810-1, 810-2, and 810-3, respectively. The superconducting quantum bit array 800 further comprises a tunable superconducting multimode qubit coupler 830 and a superconducting auxiliary qubit 840 which is capacitively coupled to the tunable superconducting multimode qubit coupler 830. In some embodiments, as schematically shown in FIG. 8, the superconducting data qubits 810-1, 810-2, and 810-3, and the superconducting auxiliary qubit 840 each comprise a superconducting transmon qubit having a circuit configuration and layout similar to the exemplary embodiments shown and discussed above in conjunction with FIGS. 2A and 2B, the details of which will not be repeated. In addition, the tunable superconducting multimode qubit couplers 820-1, 820-2, 820-3, and 830 each comprise a circuit configuration and layout similar to the exemplary embodiments shown and discussed above in conjunction with FIGS. 4A and 4B, the details of which will not be repeated.

As further shown in FIG. 8, each superconducting data qubit 810-1, 810-2, and 810-3 is capacitively coupled to the A mode of the respective tunable superconducting multimode qubit couplers 820-1, 820-2, and 820-3. More specifically, in the exemplary of FIG. 8, the A mode coupling is realized through direct capacitive coupling (gap capacitance) of the first and second superconducting pads 220-1 and 220-2 of the superconducting data qubit 810-1, to the respective first and second superconducting pads 401-1 and 401-2 of the tunable superconducting multimode qubit coupler 820-1. Similarly, the superconducting auxiliary qubit 840 is capacitively coupled (via direct capacitive coupling) to the A mode of the tunable superconducting multimode qubit coupler 830.

The superconducting quantum bit array 800 further comprises a capacitive bus 850 which is configured to capacitively couple the tunable superconducting multimode qubit couplers 820-1, 820-2, and 820-3 to the tunable superconducting multimode qubit coupler 830. The capacitive bus 850 comprises (i) a first capacitor pad 851 connected to the first tunable superconducting multimode qubit coupler 820-1 by a first superconducting transmission line 851-1, (ii) a second capacitor pad 852 connected to the second tunable superconducting multimode qubit coupler 820-2 by a second superconducting transmission line 852-1, (iii) a third capacitor pad 853 connected to the third tunable superconducting multimode qubit coupler 820-3 by a third superconducting transmission line 853-1, and (iv) a fourth capacitor pad 854 connected to the tunable superconducting multimode qubit coupler 830 by a fourth superconducting transmission line 854-1. The first, second, and third capacitor pads 851, 852, and 853 are disposed adjacent to different edges of the fourth capacitor pad 854. The fourth capacitor pad 854 has a size which is greater than a respective size of the first, second, and third capacitor pads 851, 852, and 853. In some embodiments, the superconducting transmission lines 851-1, 852-1, 853-1, and 854-1 are implemented as superconducting coplanar waveguides.

In the exemplary embodiment of FIG. 8, the capacitive bus 850 is coupled to the B modes of the respective tunable superconducting multimode qubit couplers 820-1, 820-2, 820-3, and 830. In this configuration, the B modes of the tunable superconducting multimode qubit couplers 820-1, 820-2, 820-3, and 830 are commonly coupled together through the capacitive bus 850. The capacitive bus 850 is structurally configured to ensure that the amount of capacitive coupling of the tunable superconducting multimode qubit coupler 830 (of the superconducting auxiliary qubit 840) to each of the tunable superconducting multimode qubit couplers 820-1, 820-2, and 820-3 (of the superconducting data qubits 810-1, 810-2, and 810-3) is greater than the amount of capacitive coupling between the tunable superconducting multimode qubit couplers 820-1, 820-2, and 820-3. This is achieved by, e.g., making the size of the fourth capacitor pad 854 larger than the respective sizes of the first, second, and third capacitor pads 851, 852, and 853.

As explained above, the suppression of crosstalk (e.g., exchange interaction or static ZZ interaction) between the superconducting data qubits 810-1, 810-2, and 810-3 and between the superconducting auxiliary qubit 840 and the superconducting data qubits 810-1, 810-2, and 810-3 is achieved by deactivating the tunable superconducting multimode qubit couplers 820-1, 820-2, 820-3, and 830, where respective flux control signals are applied to respective SQUIDs 424 of the tunable superconducting multimode qubit couplers 820-1, 820-2, 820-3, and 830 to tune the SQUIDs 424 to have the same Josephson energy as the respective single Josephson tunnel junction devices 422 of the tunable superconducting multimode qubit couplers 820-1, 820-2, 820-3, and 830. When the tunable superconducting multimode qubit couplers 820-1, 820-2, 820-3, and 830 are in a deactivated state, the superconducting data qubits 810-1, 810-2, and 810-3 and the superconducting auxiliary qubit 840 will couple only to the A modes of the respective tunable superconducting multimode qubit couplers 820-1, 820-2, 820-3, and 830, thereby suppressing or otherwise turning off interactions among the superconducting data qubits 810-1, 810-2, and 810-3 and the superconducting auxiliary qubit 840.

On the other hand, to turn on ZZ coupling between the superconducting auxiliary qubit 840 and a given one of the superconducting data qubits 810-1, 810-2, and 810-3, respective flux control signals are applied to respective SQUIDs of the tunable superconducting multimode qubit coupler 830 and the associated tunable superconducting multimode qubit coupler 820-1, 820-2, 820-3 for the given superconducting data qubit, to tune the SQUIDs to have a different Josephson energy as the respective single Josephson tunnel junction devices of the superconducting multimode qubit couplers, which disrupts the mode-selective coupling and causes the superconducting auxiliary qubit 840 and the given superconducting data qubit to be coupled to the B modes of the superconducting multimode qubit couplers, and thus coupled to each other.

While the exemplary embodiment of FIG. 8 shows three superconducting data qubits 810-1, 810-2, and 810-3 that are selectively coupled to a single superconducting auxiliary qubit 840 through respective superconducting multimode qubit couplers, in other embodiments, more than three superconducting data qubits can be coupled to the superconducting auxiliary qubit 840. For example, the fourth capacitor pad 854 of the capacitive bus 850 shown in FIG. 8 is rectangular-shaped, which provides three edges for coupling to the three capacitor pads 851, 852, and 853. In other embodiments, the fourth capacitor pad 854 can have other shapes to provide additional edges to couple additional pairs of data qubits and associated multimode qubit couplers. For example, the fourth capacitor pad 854 can be hexagonal-shaped to provide five (5) edges for coupling to five (5) capacitor pads (e.g., allowing five (5) superconducting data qubits to be coupled to a single auxiliary qubit), or octagonal-shaped to provide seven (7) edges for coupling to seven (7) capacitor pads (e.g., allowing seven (7) superconducting data qubits to be coupled to a single auxiliary qubit), etc.

In some embodiments, the superconducting data qubits 810-1, 810-2, and 810-3 and superconducting auxiliary qubit 840 have transition frequencies that are detuned from each other. For example, in an exemplary non-limiting embodiment, the superconducting data qubits 810-1, 810-2, and 810-3 and superconducting auxiliary qubit 840 have transition frequencies of ~5.5 GHz, but detuned by plus/minus 100 MHz. For example, a superconducting data qubit can have a transition frequency of 5.45 GHz, while the superconducting auxiliary qubit 840 has transition frequency of 5.55 GHz. Furthermore, in some embodiments, each tunable superconducting multimode qubit coupler 820-1, 820-2, 820-3 and 830 is substantially the same, e.g., same normal A mode frequency and B mode frequency. For example, in an exemplary non-limiting embodiment, in an OFF state, each tunable superconducting multimode qubit coupler 820-1, 820-2, 820-3 and 830 has a normal A mode frequency of −2.5 GHz, and a normal B mode frequency of ~4.0 GHz. Furthermore, in some embodiments, the coupling capacitances between the superconducting transmon qubits and respective superconducting multimode qubit couplers are in the order of about 10 femtofarad (fF) to about 20 fF.

FIG. 8 schematically illustrates an array of superconducting quantum bits comprising superconducting data qubits that are coupled to auxiliary qubits using superconducting multimode quantum bit couplers, which is effective to control interactions for relatively short-range coupling across a given qubit chip or between stacked qubit chips, where the auxiliary bits are disposed in relatively close proximity to the superconducting data qubits. In other embodiments, for long-range coupling between the superconducting data qubits and a superconducting auxiliary qubit, a long coplanar waveguide resonator can be utilized to couple the superconducting multimode qubit couplers (associated with superconducting data qubits) to the superconducting auxiliary qubit, while eliminating the need for coupling the superconducting auxiliary qubit to an associated superconducting multimode qubit coupler.

Figure 9:
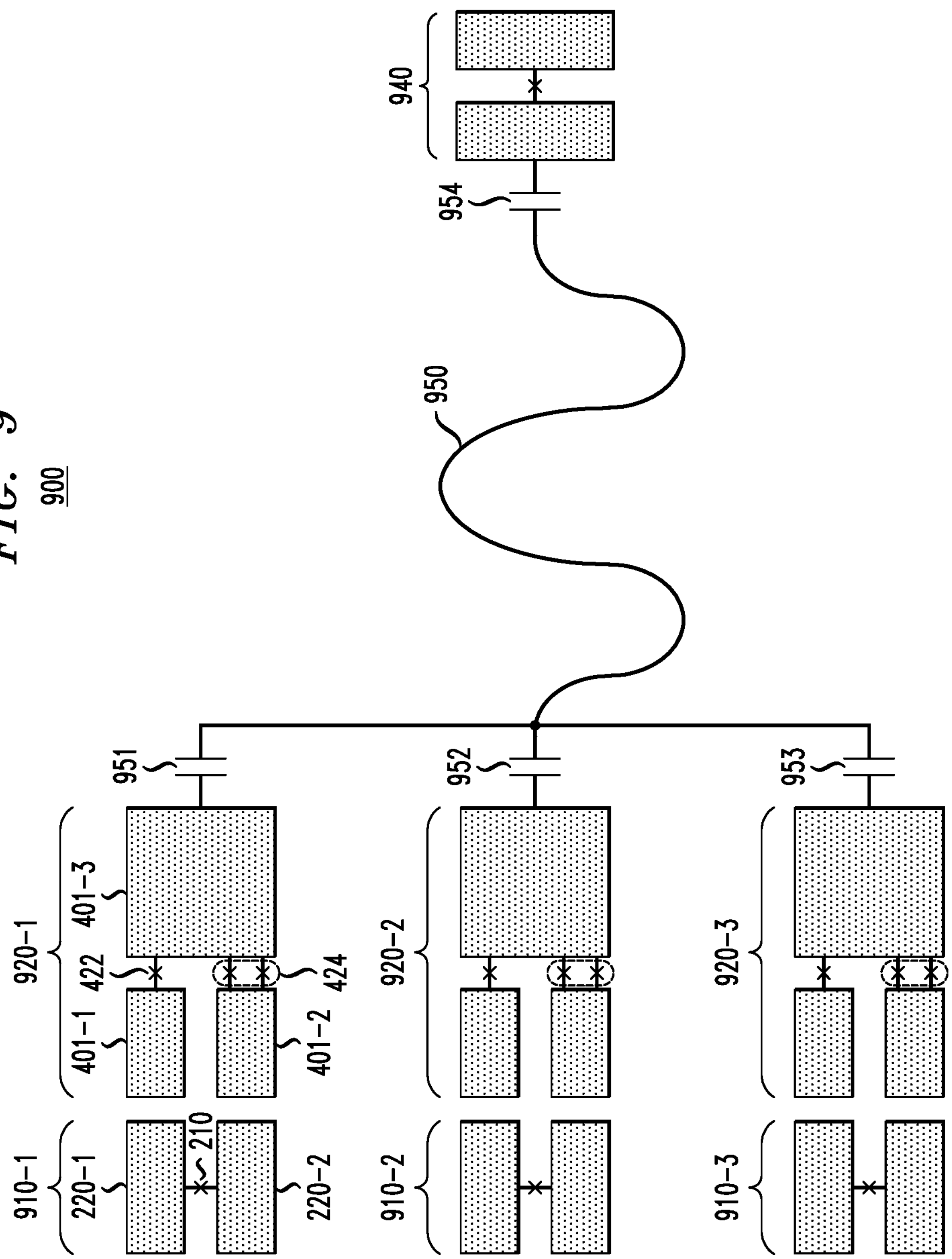
FIG. 9 schematically illustrates a quantum device which comprises an array of superconducting quantum bits comprising superconducting data quantum bits that are coupled to a superconducting auxiliary quantum bit using superconducting quantum bit couplers and a transmission line resonator, according to an exemplary embodiment of the disclosure.

For example, FIG. 9 schematically illustrates a quantum device which comprises an array of superconducting quantum bits comprising superconducting data quantum bits that are coupled to a superconducting auxiliary quantum bit using superconducting quantum bit couplers and a transmission line resonator, according to an exemplary embodiment of the disclosure. In particular, FIG. 9 schematically illustrates a quantum device which comprises a superconducting quantum bit array 900 comprising superconducting data qubits 910-1, 910-2, and 910-3, and tunable superconducting multimode qubit couplers 920-1, 920-2, and 920-3, which are capacitively coupled to the superconducting data qubits 910-1, 910-2, and 910-3, respectively. The superconducting quantum bit array 900 further comprises a superconducting auxiliary qubit 940 which is coupled to the tunable superconducting multimode qubit couplers 920-1, 920-2, and 920-3 by a superconducting transmission line resonator 950.

In some embodiments, as schematically shown in FIG. 9, the superconducting data qubits 910-1, 910-2, and 910-3, and the superconducting auxiliary qubit 940 each comprise a superconducting transmon qubit having a circuit configuration and layout similar to the exemplary embodiments shown and discussed above in conjunction with FIGS. 2A and 2B, the details of which will not be repeated. In addition, the tunable superconducting multimode qubit couplers 920-1, 920-2, and 920-3 each comprise a circuit configuration and layout similar to the exemplary embodiments shown and discussed above in conjunction with FIGS. 4A and 4B, the details of which will not be repeated.

In some embodiments, the superconducting transmission line resonator 950 comprises a coplanar waveguide resonator bus with a given resonant frequency (e.g., near 5 GHz). The superconducting transmission line resonator 950 can be several millimeters in length across a same qubit chip, or extend from a first qubit chip to a second qubit chip, which are vertically stacked and coupled together, via indium bump bonds, using known structures and fabrication techniques. In some embodiments, the superconducting data qubits 910-1, 910-2, and 910-3, and associated tunable superconducting multimode qubit couplers 920-1, 920-2, and 920-3 are disposed on the first qubit chip, while the superconducting auxiliary qubit 940 (and other auxiliary qubits) are disposed on the second qubit chip.

Furthermore, as schematically illustrated in FIG. 9, a first end of the superconducting transmission line resonator 950 is capacitively coupled to the respective B modes of the tunable superconducting multimode qubit couplers 920-1, 920-2, and 920-3 via respective coupling capacitors 951, 952, and 953, and a second end of the superconducting transmission line resonator 950 is capacitively coupled to the superconducting auxiliary qubit 940 via a coupling capacitor 954. The coupling capacitors 951, 952, 953, and 954 can be implemented using suitable capacitive coupling structures and techniques known to those of ordinary skill in the art.

It is to be noted that depending on the length of the superconducting transmission line resonator 950, the tunable superconducting multimode qubit couplers 920-1, 920-2, and 920-3 can be coupled to the superconducting transmission line resonator 950 at the fundamental mode of the superconducting transmission line resonator 950 (e.g., near 5 GHz) or at higher mode of a longer length of the superconducting transmission line resonator 950, in which case the length of the transmission line resonator is adjusted so that the higher mode is also near 5 GHz wherein lower frequency modes will play no role. For example, in some embodiments, the superconducting transmission line resonator 950 comprises an open-circuited half-wavelength ($\lambda/2$) transmission line which behaves as a parallel resonant circuit with length $1=(n\times\lambda)/2$, wherein n denotes a resonant mode number (n=1, 2, 3, . . . ). Thus, for a target resonance of approximately 5 GHz, the superconducting transmission line resonator 950 can have (i) a length $l=\lambda/2$ (n=1) which corresponds to a fundamental mode frequency of $f_0 \approx 5$ GHz, or (ii) a length $l=(n\times\lambda)/2$ which corresponds to a higher mode frequency of $f_n = n\times f_0 \approx 5$ GHz.

In the exemplary embodiment of FIG. 9, coupling the superconducting auxiliary qubit 940 directly to the superconducting transmission line resonator 950 ensures that the superconducting data qubits 910-1, 910-2, and 910-3, will couple more strongly to the superconducting auxiliary qubit 940 than they do to each other. Indeed, as noted above, the superconducting transmission line resonator 950 eliminates the need to couple a dedicated superconducting multimode qubit coupler to the superconducting auxiliary qubit 940 because the superconducting transmission line resonator 950 has a relatively large capacitance to ground, which serves to reduce crosstalk between the superconducting data qubits 910-1, 910-2, and 910-3 that are coupled to the superconducting auxiliary qubit 940.

In some embodiments, the superconducting data qubits 910-1, 910-2, and 910-3 and superconducting auxiliary qubit 940 have transition frequencies that are detuned from each other, and which depend in part on the resonance of the superconducting transmission line resonator 950. For example, in an exemplary non-limiting embodiment, the superconducting auxiliary qubit 940 has a transition frequency that is about 200 MHz to about 300 MHz below the resonance of the superconducting transmission line resonator 950. For example, the superconducting transmission line resonator 950 can be designed to have a resonance of 5 GHz, and the superconducting auxiliary qubit 940 has a transition frequency of approximately 4.7 GHz to 4.8 GHz. Further, in an exemplary non-limiting embodiment, the superconducting data qubits 910-1, 910-2, and 910-3 and the superconducting auxiliary qubit 940 have transition frequencies of 4.7-4.8 GHz, but detuned by plus/minus 100 MHz.

Moreover, in some embodiments, each tunable superconducting multimode qubit coupler 920-1, 920-2, and 920-3 is substantially the same, e.g., same normal A mode frequency and B mode frequency. For example, in an exemplary non-limiting embodiment, in an OFF state, each tunable superconducting multimode qubit coupler 920-1, 920-2, and 920-3 has a normal A mode frequency of ~2.0 GHz, and a normal B mode frequency of ~3.5 GHz. The exemplary operating frequencies can all be adjusted up or down, in unison, to accommodate other design concerns. Furthermore, in some embodiments, the coupling capacitances between the superconducting transmon data qubits and respective superconducting multimode qubit couplers are in the order of about 10 fF to about 20 fF.

Figure 10:
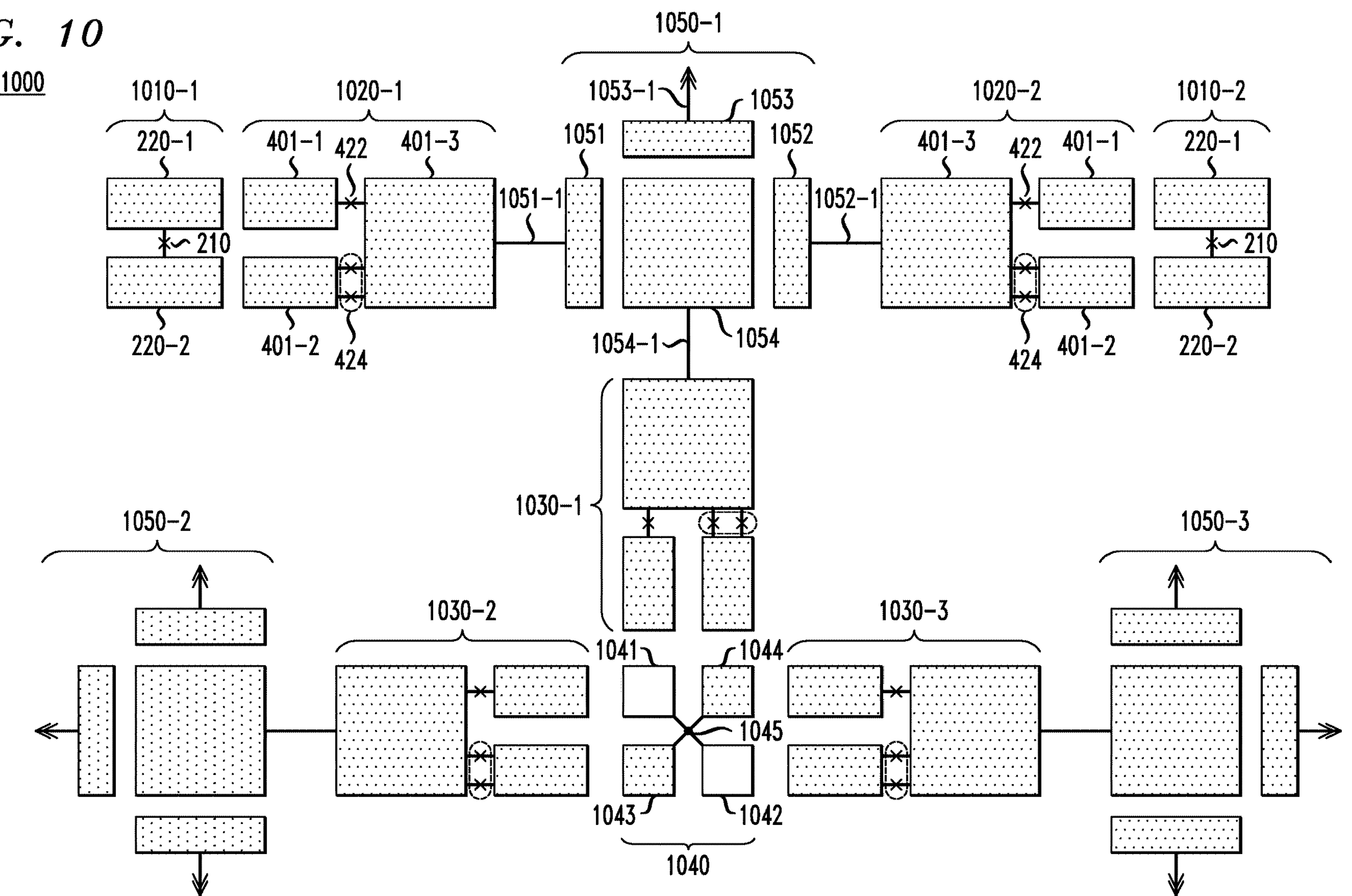
FIG. 10 schematically illustrates a quantum device which comprises an array of superconducting quantum bits comprising superconducting data quantum bits that are coupled to a superconducting auxiliary quantum bit using superconducting quantum bit couplers, according to another exemplary embodiment of the disclosure.

FIG. 10 schematically illustrates a quantum device which comprises an array of superconducting quantum bits comprising superconducting data quantum bits that are coupled to a superconducting auxiliary quantum bit using superconducting quantum bit couplers, according to another exemplary embodiment of the disclosure. In particular, FIG. 10 schematically illustrates a quantum device which comprises a superconducting quantum bit array 1000 comprising superconducting data qubits 1010-1 and 1010-2, and associated tunable superconducting multimode qubit couplers 1020-1 and 1020-2, which are capacitively coupled to the superconducting data qubits 1010-1, and 1010-2, respectively. The superconducting quantum bit array 1000 further comprises a superconducting auxiliary qubit 1040 which is coupled to a plurality of tunable superconducting multimode qubit couplers 1030-1, 1030-2, and 1030-3. The superconducting quantum bit array 1000 further comprises a plurality of capacitive busses 1050-1, 1050-2, and 1050-3.

The superconducting quantum bit array 1000 is similar in configuration as the superconducting quantum bit array 800 of FIG. 8, except that the superconducting auxiliary qubit 1040 comprises a superconducting quadrupole transmon qubit, which allows dipole-dipole interaction and coupling with at least three tunable superconducting multimode qubit couplers 1030-1, 1030-2, and 1030-3, such as shown. The superconducting quadrupole transmon qubit 1040 operates in a similar manner to the superconducting transmon qubit as shown in FIGS. 2A and 2B, except that the superconducting quadrupole transmon qubit 1040 comprises a different arrangement of the shunt capacitor pads, which have a quadrupole charge pattern when excited.

For example, as illustrated in FIG. 10, the superconducting quadrupole transmon qubit 1040 comprises a single Josephson tunnel junction device 1045, having a Manhattan Josephson junction framework, and first, second, third, and fourth superconducting pads 1041, 1042, 1043, and 1044, which collectively comprise capacitor electrode pads that form a shunt capacitor of the superconducting quadrupole transmon qubit 1040. The first, second, third, and fourth superconducting pads 1041, 1042, 1043, and 1044 of the superconducting quadrupole transmon qubit 1040 are arranged in a rectangular array. The first and second superconducting pads 1041 and 1042 are configured to implement a first capacitor electrode of the shunt capacitor, and are commonly connected to a first electrode of the single Josephson tunnel junction device 1045. The third and fourth superconducting pads 1043 and 1044 are configured to implement a second capacitor electrode of the shunt capacitor, and are commonly connected to a second electrode of the single Josephson tunnel junction device 1045. With the exemplary quadrupole configuration, as shown in FIG. 10, the superconducting quadrupole transmon qubit 1040 is configured to capacitively couple directly to the A mode of each of the three tunable superconducting multimode qubit couplers 1030-1, 1030-2, and 1030-3.

Similar to the exemplary array layout of FIG. 8, each capacitive bus 1050-1, 1050-2, and 1050-3 in FIG. 10 is configured to couple to three pairs of superconducting data qubits and associated superconducting multimode qubit couplers. For ease of illustration, FIG. 10 depicts two superconducting data qubits and associated superconducting multimode qubit couplers which are coupled to the capacitive bus 1050-1. The capacitive bus 1050-1 comprises (i) a first capacitor pad 1051 connected to the first superconducting multimode qubit coupler 1020-1 by a first superconducting transmission line 1051-1, (ii) a second capacitor pad 1052 connected to the second superconducting multimode qubit coupler 1020-2 by a second superconducting transmission line 1052-1, (iii) a third capacitor pad 1053 connected to a third superconducting multimode qubit coupler (not shown) by a third superconducting transmission line 1053-1, and (iv) a fourth capacitor pad 1054 connected to the tunable superconducting multimode qubit coupler 1030-1 by a fourth superconducting transmission line 1054-1. The exemplary array layout shown in FIG. 10 allows nine (9) superconducting data qubits to be selectively coupled to the superconducting auxiliary qubit 1040 by selective activation/deactivation of the proper superconducting multimode qubit couplers.

Figure 11:
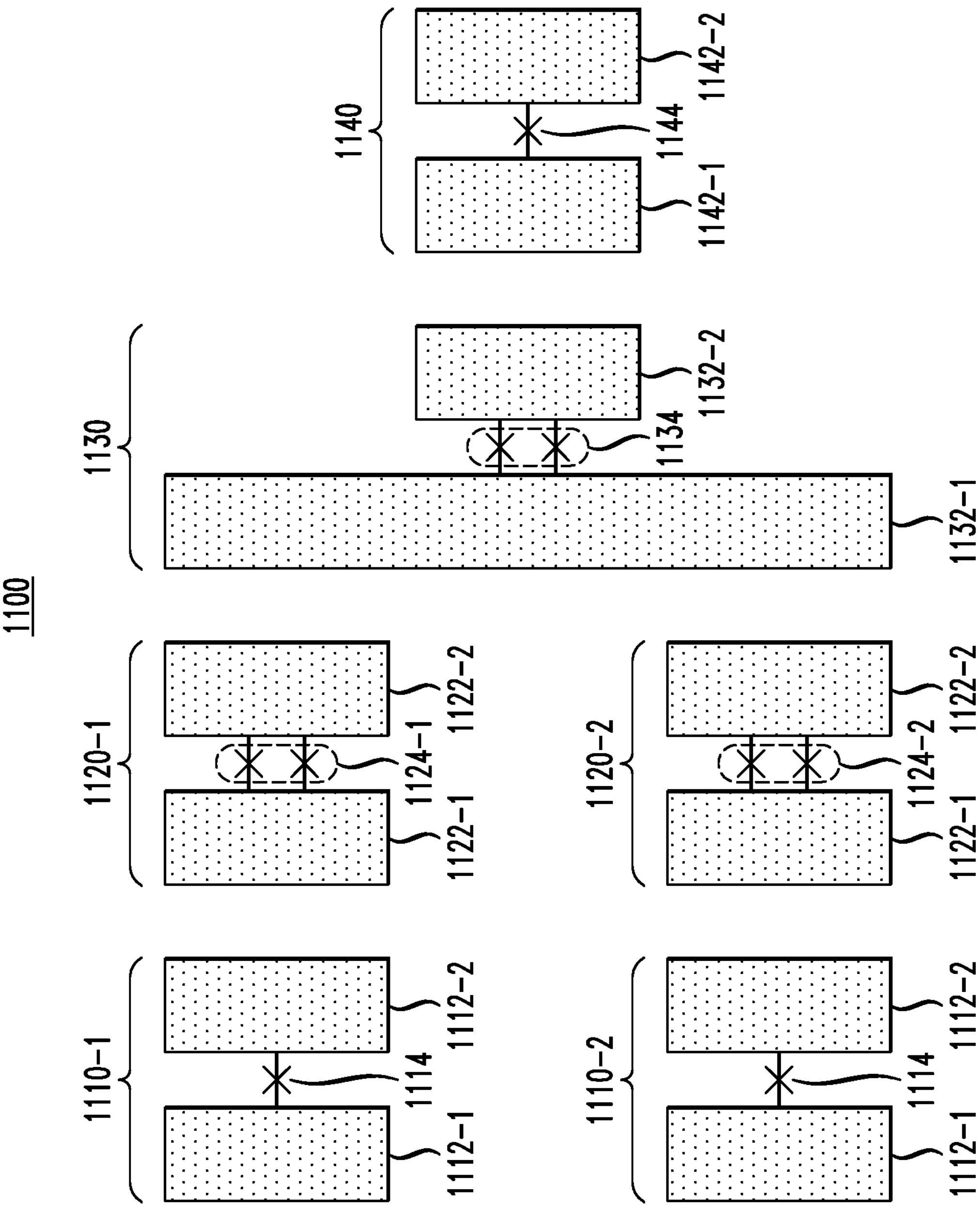
FIG. 11 schematically illustrates a quantum device which comprises an array of superconducting quantum bits comprising superconducting data quantum bits that are coupled to a superconducting auxiliary quantum bit using superconducting quantum bit couplers, according to another exemplary embodiment of the disclosure.

FIG. 11 schematically illustrates a quantum device which comprises an array of superconducting quantum bits comprising superconducting data quantum bits that are coupled to a superconducting auxiliary quantum bit using superconducting quantum bit couplers, according to another exemplary embodiment of the disclosure. In particular, FIG. 11 schematically illustrates a superconducting quantum bit array 1100 which utilizes tunable transmon qubit couplers to selectively couple superconducting data qubits with a superconducting auxiliary qubit. For example, the superconducting quantum bit array 1100 comprises superconducting data qubits 1110-1 and 1110-2 and tunable superconducting transmon qubit couplers 1120-1 and 1120-2, which are capacitively coupled to the superconducting data qubits 1110-1 and 1110-2, respectively. The superconducting quantum bit array 1100 further comprises a tunable superconducting transmon qubit coupler 1130 and a superconducting auxiliary qubit 1140 which is capacitively coupled to the tunable superconducting transmon qubit coupler 1130.

The superconducting data qubits 1110-1 and 1110-2 each comprise a respective planar capacitor comprising a first superconducting pad 1112-1 and a second superconducting pad 1112-2, and a Josephson tunnel junction device 1114 that is coupled to, and disposed between, the first and second superconducting pads 1112-1 and 1112-2. Similarly, the superconducting auxiliary qubit 1140 comprises a planar capacitor comprising a first superconducting pad 1142-1 and a second superconducting pad 1142-2, and a Josephson tunnel junction device 1144 that is coupled to, and disposed between, the first and second superconducting pads 1142-1 and 1142-2.

The tunable superconducting transmon qubit couplers 1120-1 and 1120-2 each comprise a respective planar capacitor comprising a first superconducting pad 1122-1 and a second superconducting pad 1122-2, and respective SQUIDs 1124-1 and 1124-2, wherein each SQUID 1124-1 and 1124-2 comprises two Josephson tunnel junction devices that are coupled to, and connected in parallel between, the first and second superconducting pads 1122-1 and 1122-2. Similarly, the tunable superconducting transmon qubit coupler 1130 comprises a planar capacitor comprising a first superconducting pad 1132-1 and a second superconducting pad 1132-2, and a SQUID 1134 which comprises two Josephson tunnel junction devices that are coupled to, and connected in parallel between, the first and second superconducting pads 1132-1 and 1132-2.

As schematically illustrated in FIG. 11, the first superconducting pad 1132-1 of the tunable superconducting transmon qubit coupler 1130 is directly capacitively coupled (via gap capacitance) to respective second superconducting pads 1122-2 of the tunable superconducting transmon qubit couplers 1120-1 and 1120-2, and the second superconducting pad 1132-2 of the tunable superconducting transmon qubit coupler 1130 is directly capacitively coupled to the first superconducting pad 1142-1 of the superconducting auxiliary qubit 1140. In addition, the respective second superconducting pads 1112-2 of the superconducting data qubits 1110-1 and 1110-2 are directly capacitively coupled (via gap capacitance) to the respective first superconducting pads 1122-1 of the tunable superconducting transmon qubit couplers 1120-1 and 1120-2.

The SQUIDs 1124-1, 1124-2, and 1134 of the respective tunable superconducting transmon qubit couplers 1120-1, 1120-2, and 1130 provide flux-tunable control mechanisms to tune the respective transition frequencies of the tunable superconducting transmon qubit couplers 1120-1, 1120-2, and 1130 using respective flux bias control signals applied to the SQUIDs 1124-1, 1124-2, and 1134, for the purpose of selectively controlling the coupling (e.g., exchange interaction) between the superconducting data qubits 1110-1 and 1110-2 and the superconducting auxiliary qubit 1140. Each tunable superconducting transmon qubit coupler 1120-1, 1120-2, and 1130 comprises a superconducting qubit coupler which is configured to operate in a first state (e.g., OFF state or deactivated state) and a second state (e.g., ON state or activated state) in response to a respective control signal applied thereto.

More specifically, in some embodiments, a given superconducting transmon qubit coupler is considered to be an OFF state when its respective SQUID and transition frequency are tuned so as to null out any ZZ coupling between two superconducting transmon qubits (e.g., data qubit and auxiliary qubit) that are coupled (either directly or indirectly) to the given superconducting transmon qubit coupler. In particular, a given superconducting transmon qubit coupler is considered to be an OFF state when the transition frequency of the given superconducting transmon qubit coupler is tuned (via the respective SQUID) to be far from the transition frequencies of the superconducting data qubits 1110-1 and 1110-2 and the transition frequency of the superconducting auxiliary qubit 1140. On the other hand, the given superconducting transmon qubit coupler is considered to an in an ON state when its respective SQUID and transition frequency are tuned so as to be close in frequency to the transition frequencies of the two superconducting transmon qubits (e.g., data qubit and auxiliary qubit) that are coupled (either directly or indirectly) to the given superconducting transmon qubit coupler.

For example, in a non-limiting embodiment, where the superconducting data qubits 1110-1 and 1110-2 and the superconducting auxiliary qubit 1140 have respective transition frequencies in the range of about 5.0 GHz to about 5.5 GHz, a given superconducting transmon qubit coupler is deemed to be in an ON state when the given superconducting transmon qubit coupler is tuned (via a flux bias control signal applied to the associated SQUID) to have a transition frequency of near 5.0 GHz, whereas the given superconducting transmon qubit coupler is deemed to be in an OFF state when the given superconducting transmon qubit coupler is tuned (via a flux bias control signal applied to the associated SQUID) to have a transition frequency of near 3.5 GHz.

The cancellation of ZZ coupling between the superconducting data qubit and superconducting auxiliary qubit that are coupled (either directly or indirectly) to the given superconducting transmon qubit coupler occurs because the superconducting data and auxiliary qubits interact not only through the given superconducting transmon qubit coupler, but also through direct capacitive coupling, e.g., stray capacitance, capacitance through the transmon coupler itself, or a separate bypass capacitor. In this regard, when the given superconducting transmon qubit coupler is tuned to its OFF-state transition frequency, these two types of capacitive coupling essentially become equal in magnitude but opposite in sign, causing a net zero ZZ coupling.

It is to be noted that the exemplary superconducting quantum devices shown in FIGS. 2B, 3B, 4B, 8, 9, 10, and 11 can be implemented using planar microwave circuit elements that are formed on a substrate (e.g., silicon substrate) using state-of-the-art semiconductor fabrication techniques and materials. For example, the various components of the superconducting qubits (e.g., Josephson tunnel junction devices, inductors, capacitors), interconnects, coupling circuitry, flux-bias control lines, qubit drive lines, the state readout lines, etc., comprise lithographically defined patterns of superconducting materials formed on a semiconductor substrate. The circuit elements can be formed using various types of superconductor materials that are suitable for a given application, including, but not limited to, elementary metals such as niobium (Nb), aluminum (Al), tantalum (Ta), and compounds such as titanium nitride (TiN), niobium nitride (NbN), niobium titanium nitride (NbTiN), etc. A Josephson tunnel junction device comprises two superconducting electrodes that are separated by a thin insulating barrier. For example, a Josephson tunnel junction device for a superconducting qubit may comprise an Al—$AlO_x$—Al trilayer tunnel junction that is fabricated using a double-angle evaporation technique, or other suitable fabrication techniques.

Figure 12:
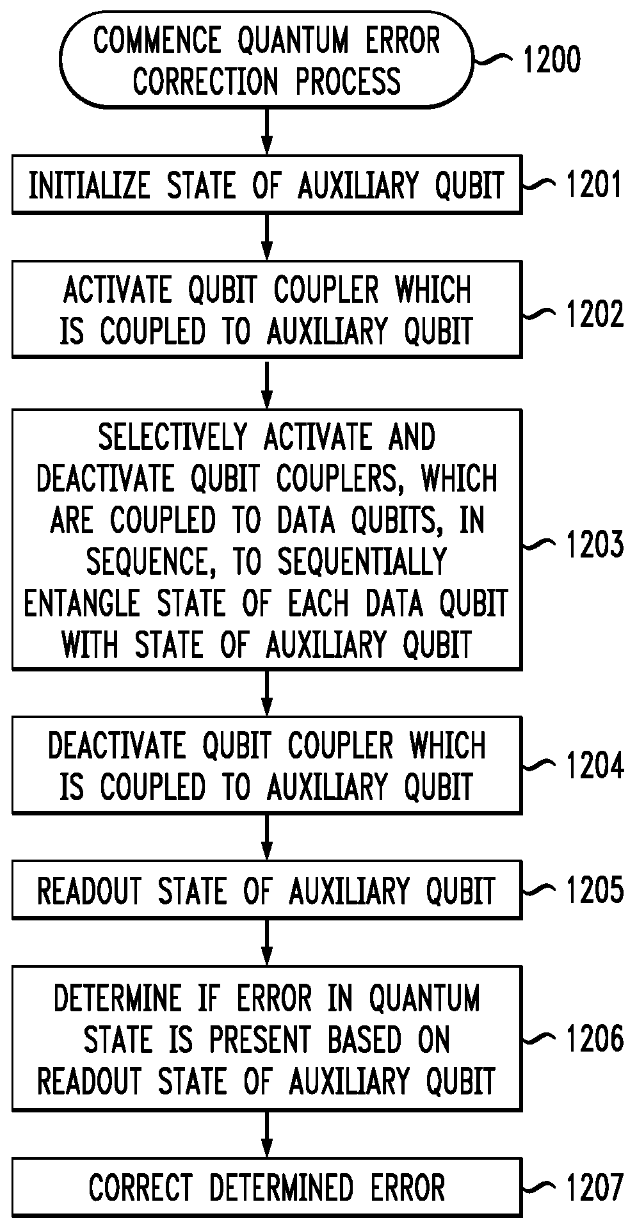
FIG. 12 is a flow diagram of a method for performing quantum error correction process, according to an exemplary embodiment of the disclosure.

FIG. 12 is a flow diagram of a method for performing quantum error correction process according to an exemplary embodiment of the disclosure. For illustrative purposes, the process flow of FIG. 12 will be discussed in the context of the exemplary quantum system shown in FIG. 8. A quantum computing system commences a quantum error correction process (block 1200). As an initial step, a state of an auxiliary qubit is initialized to a ground state (block 1201). For example, in FIG. 8, a microwave control pulse is applied to the superconducting auxiliary qubit 840 to initialize the superconducting auxiliary qubit 840 to the ground state. The quantum error correction process proceeds to activate the superconducting qubit coupler which is coupled to the auxiliary qubit (block 1202). For example, in FIG. 8, a flux control signal is applied to the SQUID of the tunable superconducting multimode qubit coupler 830 to disrupt the mode-selective coupling of the tunable superconducting multimode qubit coupler 830 to allow the superconducting auxiliary qubit 840 to be exchanged coupled to the A and B modes of the tunable superconducting multimode qubit coupler 830.

The quantum error correction process proceeds to selectively activate and deactivate the superconducting qubit couplers, which are coupled to the superconducting data qubits, in a sequence, to sequentially entangle the state of each data qubit with the state of the superconducting auxiliary qubit (block 1203). For example, in FIG. 8, a flux control signal is applied to the SQUID 424 of the tunable superconducting multimode qubit coupler 820-1 to disrupt the mode-selective coupling of the tunable superconducting multimode qubit coupler 820-1, which allows the superconducting data qubit 810-1 to be exchanged coupled to the A and B modes of the tunable superconducting multimode qubit coupler 820-1. In this instance, the superconducting data qubit 810-1 is exchanged coupled to the superconducting auxiliary qubit 840 and the state of the superconducting data qubit 810-1 is entangled with the state of the superconducting auxiliary qubit 840. A flux control signal is then applied to the SQUID 424 of the tunable superconducting multimode qubit coupler 820-1 to enforce the mode-selective coupling of the tunable superconducting multimode qubit coupler 820-1, which causes the superconducting data qubit 810-1 to be decoupled from the B mode and only coupled to the A mode of the tunable superconducting multimode qubit coupler 820-1. This process is repeated in sequence for the remaining superconducting data qubits 810-2 and 810-3.

Once the state of each superconducting data qubit has been entangled with the superconducting auxiliary qubit, the quantum error correction process proceeds to deactivate the superconducting qubit coupler which is coupled to the auxiliary qubit (block 1204) and then perform a readout operation to readout the resulting state of the auxiliary qubit (block 1205). The quantum error correction process proceeds to determine if an error is present in the quantum state of the superconducting data qubits, based on the readout of the superconducting auxiliary qubit (block 1206), and the corrects the determine error, if present (block 1207).

It is to be noted that while the exemplary embodiments are described in the context of utilizing auxiliary qubits in the context of quantum error correction, those of ordinary skill in the art understand that auxiliary qubits can be utilized in quantum circuits for other. For example, the exemplary coupling configurations of the quantum systems and devices shown in FIGS. 5, 6, 8, 9, 10, and 11 can be implemented to facilitate interactions among a large set of data qubits, some of which may be disposed relatively far from each other on the same qubit chip, wherein the multimode qubit couplers, transmission line resonators, and auxiliary qubits are essentially utilized as "superconducting buses" to enable control and facilitate interactions between data qubits. For a conventional square or heavy hexagonal lattice, to perform a gate operation between first and second data qubits which are spaced relatively far apart from each other, multiple two-qubit gate operations would need to be performed to swap the quantum state of a first data qubit with an intermediate data qubit that is directly next to the second qubit. On the other hand, by utilizing the exemplary coupling configurations shown in, e.g., FIGS. 5, 6, 8, 9, 10, and 11, where first and second data qubits are coupled to a same auxiliary qubit, a entanglement gate operation (e.g., desired two-qubit gate operation) can be performed between the first and second data qubits by (i) performing a "swap" gate operation between the first data qubit and the auxiliary qubit, (ii) performing the desired two-qubit gate between the auxiliary qubit and the second qubit, and (iii) and performing a "swap" gate operation between the auxiliary qubit and the first data qubit. A "swap" gate is a two-qubit operation which is performed to swap the state of two qubits.

Figure 13:
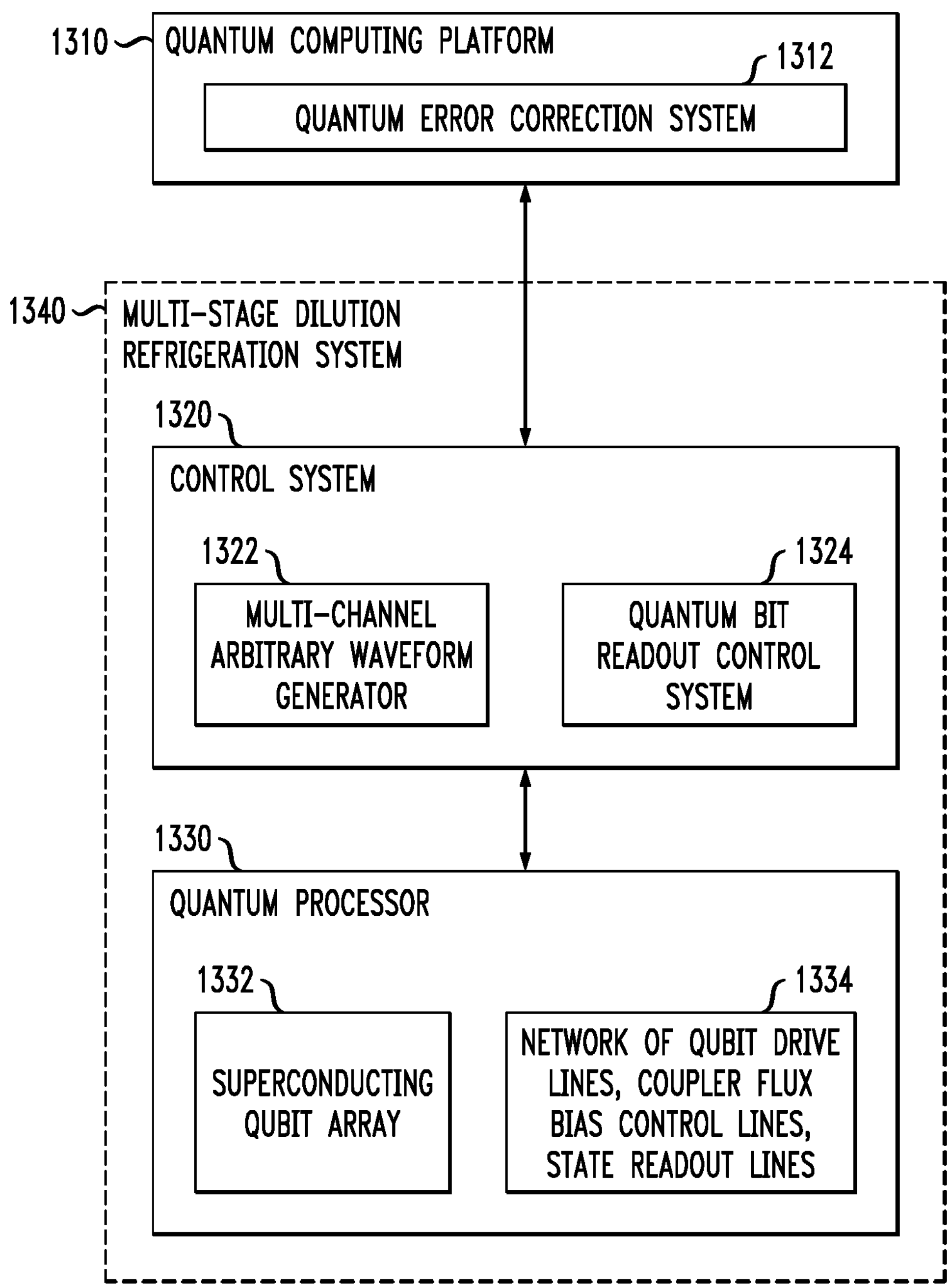
FIG. 13 schematically illustrates a quantum computing system, according to an exemplary embodiment of the disclosure.

FIG. 13 schematically illustrates a quantum computing system, according to an exemplary embodiment of the disclosure. In particular, FIG. 13 schematically illustrates a quantum computing system 1300 which comprises a quantum computing platform 1310, a control system 1320, and a quantum processor 1330. In some embodiments, the quantum computing platform 1310 implements software control programs such as a software-based quantum error correction system 1312 to perform a quantum error correction process such as discussed above in conjunction with, e.g., FIG. 12, as well as perform other software-controlled processes such as qubit calibration operations. In addition, in some embodiments, the control system 1320 comprises a multi-channel arbitrary waveform generator 1322, and a quantum bit readout control system 1324. The quantum processor 1330 comprises a solid-state semiconductor chip having a superconducting qubit array 1332 and a network 1334 of qubit drive lines, coupler flux-bias control lines, and qubit state readout lines, and other circuit QED components that may be needed for a given application or quantum system configuration.

In some embodiments, the control system 1320 and the quantum processor 1330 are disposed in a dilution refrigeration system 1340 which can generate cryogenic temperatures that are sufficient to operate components of the control system 1320 for quantum computing applications. For example, the quantum processor 1330 may need to be cooled down to near-absolute zero, e.g., 10-15 millikelvin (mK), to allow the superconducting qubits to exhibit quantum behaviors. In some embodiments, the dilution refrigeration system 1340 comprises a multi-stage dilution refrigerator where the components of the control system 1320 can be maintained at different cryogenic temperatures, as needed. For example, while the quantum processor 1330 may need to be cooled down to, e.g., 10-15 mK, the circuit components of the control system 1320 may be operated at cryogenic temperatures greater than 10-15 mK (e.g., cryogenic temperatures in a range of 3 K-4 K), depending on the configuration of the quantum computing system.

In some embodiments, the superconducting qubit array 1332 comprises a quantum system of superconducting data qubits, superconducting auxiliary qubits, and superconducting qubit couplers, such as shown in FIG. 8, 9, 10, or 11, etc. The number of superconducting qubits of the qubit array 1332 can be on the order of tens, hundreds, thousands, or more, etc. The network 1334 of qubit drive lines, coupler flux bias control lines, and qubit state readout lines, etc., are configured to apply microwave control signals to superconducting qubits and coupler circuitry in the superconducting qubit array 1332 to perform various types of gate operations, e.g., single-gate operations, entanglement gate operations (e.g., CPHASE gate operation), perform error correction operations, etc., as well read the quantum states of the superconducting qubits. For example, as noted above, microwave control pulses are applied to the qubit drive lines of respective superconducting qubits to change the quantum state of the superconducting qubits (e.g., change the quantum state of a given qubit between the ground state and excited state, or to a superposition state) when executing quantum information processing algorithms.

Furthermore, as noted above, the state readout lines comprise readout resonators that are coupled to respective superconducting qubits. The state of a given superconducting qubit can be determined through microwave transmission measurements made between readout ports of the readout resonator. The states of the superconducting qubits are read out after executing a quantum algorithm. In some embodiments, a dispersive readout operation is performed in which a change in the resonant frequency of a given readout resonator, which is coupled to a given superconducting qubit, is utilized to readout the state (e.g., ground or excited state) of the given superconducting qubit.

The network 1334 of qubit drive lines, coupler flux bias control lines, and qubit state readout lines, etc., is coupled to the control system 1320 through a suitable hardware input/output (I/O) interface, which couples I/O signals between the control system 1320 and the quantum processor 1330. For example, the hardware I/O interface may comprise various types of hardware and components, such as RF cables, wiring, RF elements, optical fibers, heat exchanges, filters, amplifiers, isolators, etc.

In some embodiments, the multi-channel arbitrary waveform generator (AWG) 1322 and other suitable microwave pulse signal generators are configured to generate the microwave control pulses that are applied to the qubit drive lines, and the coupler drive lines to control the operation of the superconducting qubits and associated qubit coupler circuitry, when performing various gate operations to execute a given certain quantum information processing algorithm. In some embodiments, the multi-channel AWG 1322 comprises a plurality of AWG channels, which control respective superconducting qubits within the superconducting qubit array 1332 of the quantum processor 1330. In some embodiments, each AWG channel comprises a baseband signal generator, a digital-to-analog converter (DAC) stage, a filter stage, a modulation stage, an impedance matching network, and a phase-locked loop system to generate local oscillator (LO) signals (e.g., quadrature LO signals LO_I and LO_Q) for the respective modulation stages of the respective AWG channels.

In some embodiments, the multi-channel AWG 1322 comprises a quadrature AWG system which is configured to process quadrature signals, wherein a quadrature signal comprises an in-phase (I) signal component, and a quadrature-phase (Q) signal component. In each AWG channel the baseband signal generator is configured to receive baseband data as input (e.g., from the quantum computing platform), and generate digital quadrature signals I and Q which represent the input baseband data. In this process, the baseband data that is input to the baseband signal generator for a given AWG channel is separated into two orthogonal digital components including an in-phase (I) baseband component and a quadrature-phase (Q) baseband component. The baseband signal generator for the given AWG channel will generate the requisite digital quadrature baseband IQ signals which are needed to generate an analog waveform (e.g., sinusoidal voltage waveform) with a target center frequency that is configured to operate or otherwise control a given quantum bit that is coupled to the output of the given AWG channel.

The DAC stage for the given AWG channel is configured to convert a digital baseband signal (e.g., a digital IQ signal output from the baseband signal generator) to an analog baseband signal (e.g., analog baseband signals I(t) and Q(t)) having a baseband frequency. The filter stage for the given AWG channel is configured to filter the IQ analog signal components output from the DAC stage to thereby generate filtered analog IQ signals. The modulation stage for the given AWG channel is configured to perform analog IQ signal modulation (e.g., single-sideband (SSB) modulation) by mixing the filtered analog signals I(t) and Q(t), which are output from the filter stage, with quadrature LO signals (e.g., an in-phase LO signal (LO_I) and a quadrature-phase LO signal (LO_Q)) to generate and output an analog RF signal (e.g., a single-sideband modulated RF output signal).

In some embodiments, the quantum bit readout control system 1324 comprises a microwave pulse signal generator that is configured to apply a microwave tone to a given readout resonator line of a given superconducting qubit to perform a readout operation to readout the state of the given superconducting qubit, as well as circuitry that is configured to process the readout signal generated by the readout resonator line to determine the state of the given superconducting qubit, using techniques known to those of ordinary skill in the art.

The quantum computing platform 1310 comprises a software and hardware platform which comprises various software layers that are configured to perform various functions, including, but not limited to, generating and implementing various quantum applications using suitable quantum programming languages, configuring and implementing various quantum gate operations, compiling quantum programs into a quantum assembly language, implementing and utilizing a suitable quantum instruction set architecture (ISA), performing calibration operations to calibrate the quantum circuit elements and gate operations, etc. In addition, the quantum computing platform 1310 comprises a hardware architecture of processors, memory, etc., which is configured to control the execution of quantum applications, and interface with the control system 1320 to (i) generate digital control signals that are converted to analog microwave control signals by the control system 1320, to control operations of the quantum processor 1330 when executing a given quantum application, and (ii) to obtain and process digital signals received from the control system 1320, which represent the processing results generated by the quantum processor 1330 when executing various gate operations for a given quantum application.

Figure 14:
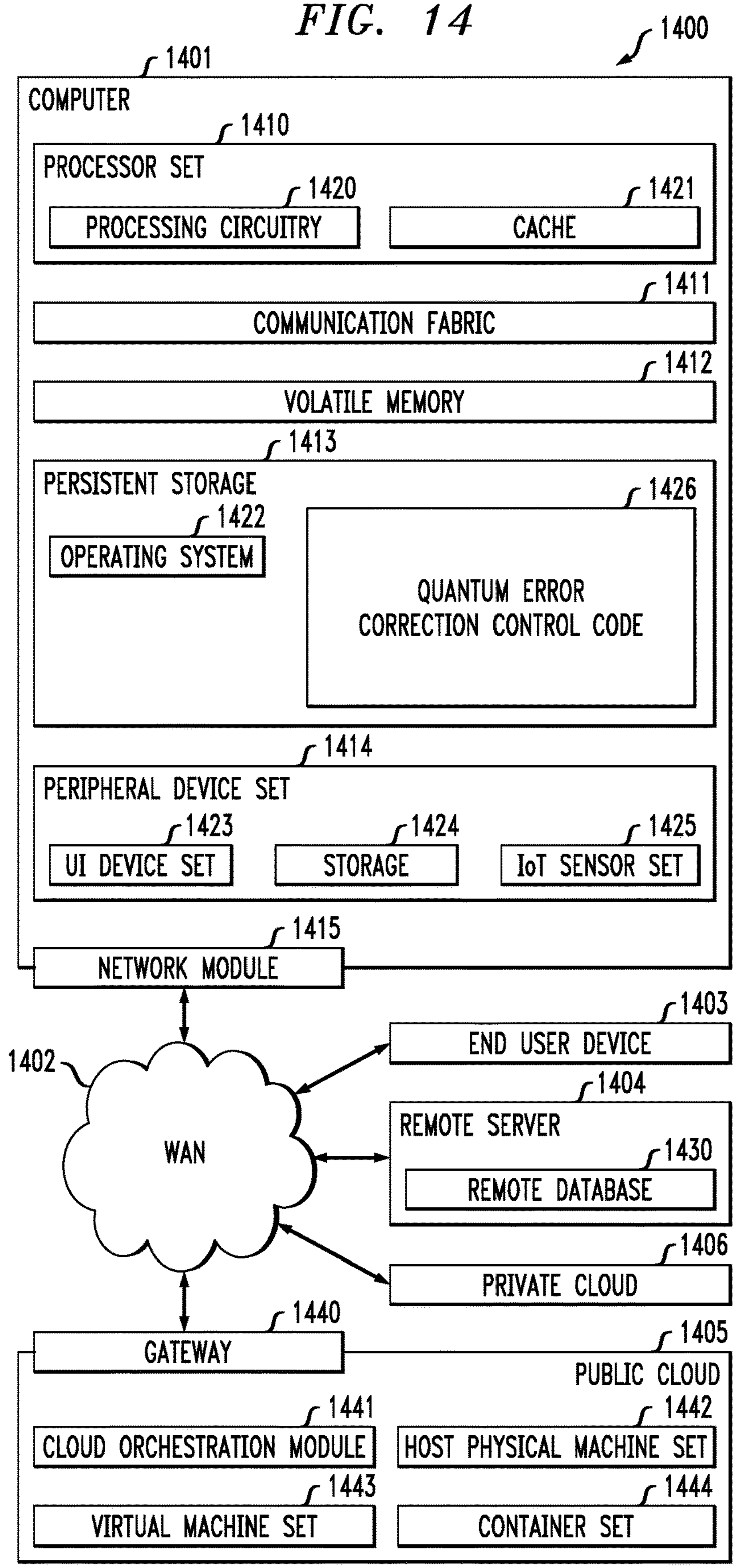
FIG. 14 schematically illustrates an exemplary architecture of a computing environment for hosting a quantum computing platform and performing quantum information processing, according to an exemplary embodiment of the disclosure.

In some exemplary embodiments, the quantum computing platform 1310 of the quantum computing system 1300 may be implemented using any suitable computing system architecture (e.g., as shown in FIG. 14) which is configured to implement methods to support quantum computing operations by executing computer readable program instructions that are embodied on a computer program product which includes a computer readable storage medium (or media) having such computer readable program instructions thereon for causing a processor to perform control methods as discussed herein.

The quantum computing platform 1310 comprises a software and hardware platform which comprises various software layers that are configured to perform various functions, including, but not limited to, generating and implementing various quantum applications using suitable quantum programming languages, configuring and implementing various quantum gate operations, compiling quantum programs into a quantum assembly language, implementing and utilizing a suitable quantum instruction set architecture (ISA), performing calibration operations to calibrate the quantum circuit elements and gate operations, etc. In addition, the quantum computing platform 1310 comprises a hardware architecture of processors, memory, etc., which is configured to control the execution of quantum applications, and interface with the control system 1320 to (i) generate digital control signals that are converted to analog microwave control signals by the control system 1320, to control operations of the quantum processor 1330 when executing a given quantum application, and (ii) to obtain and process digital signals received from the control system 1320, which represent the processing results generated by the quantum processor 1330 when executing various gate operations for a given quantum application. In some exemplary embodiments, the quantum computing platform 1310 of the quantum computing system 1300 may be implemented using any suitable computing system architecture (e.g., as shown in FIG. 14) which is configured to implement methods to support quantum computing operations by executing computer readable program instructions that are embodied on a computer program product which includes a computer readable storage medium (or media) having such computer readable program instructions thereon for causing a processor to perform control methods as discussed herein.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random-access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Computing environment 1400 of FIG. 14 contains an example of an environment for the execution of at least some of the computer code involved in performing the inventive methods, such as quantum error correction control code in block 1426 for controlling quantum error correction functions of the quantum error correction system 1312 of FIG. 13. In addition to block 1426, computing environment 1400 includes, for example, computer 1401, wide area network (WAN) 1402, end user device (EUD) 1403, remote server 1404, public cloud 1405, and private cloud 1406. In this embodiment, computer 1401 includes processor set 1410 (including processing circuitry 1420 and cache 1421), communication fabric 1411, volatile memory 1412, persistent storage 1413 (including operating system 1422 and block 1426, as identified above), peripheral device set 1414 (including user interface (UI), device set 1423, storage 1424, and Internet of Things (IoT) sensor set 1425), and network module 1415. Remote server 1404 includes remote database 1430. Public cloud 1405 includes gateway 1440, cloud orchestration module 1441, host physical machine set 1442, virtual machine set 1443, and container set 1444.

Computer 1401 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 1430. As is well understood in the art of computer technology, and depending upon the technology, performance of a computer-implemented method may be distributed among multiple computers and/or between multiple locations. On the other hand, in this presentation of computing environment 1400, detailed discussion is focused on a single computer, specifically computer 1401, to keep the presentation as simple as possible. Computer 1401 may be located in a cloud, even though it is not shown in a cloud in FIG. 14. On the other hand, computer 1401 is not required to be in a cloud except to any extent as may be affirmatively indicated.

Processor set 1410 includes one, or more, computer processors of any type now known or to be developed in the future. Processing circuitry 1420 may be distributed over multiple packages, for example, multiple, coordinated integrated circuit chips. Processing circuitry 1420 may implement multiple processor threads and/or multiple processor cores. Cache 1421 is memory that is located in the processor chip package(s) and is typically used for data or code that should be available for rapid access by the threads or cores running on processor set 1410. Cache memories are typically organized into multiple levels depending upon relative proximity to the processing circuitry. Alternatively, some, or all, of the cache for the processor set may be located "off chip." In some computing environments, processor set 1410 may be designed for working with qubits and performing quantum computing.

Computer readable program instructions are typically loaded onto computer 1401 to cause a series of operational steps to be performed by processor set 1410 of computer 1401 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 1421 and the other storage media discussed below. The program instructions, and associated data, are accessed by processor set 1410 to control and direct performance of the inventive methods. In computing environment 1400, at least some of the instructions for performing the inventive methods may be stored in block 1426 in persistent storage 1413.

Communication fabric 1411 is the signal conduction paths that allow the various components of computer 1401 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

Volatile memory 1412 is any type of volatile memory now known or to be developed in the future. Examples include dynamic type random access memory (RAM) or static type RAM. Typically, the volatile memory is characterized by random access, but this is not required unless affirmatively indicated. In computer 1401, the volatile memory 1412 is located in a single package and is internal to computer 1401, but, alternatively or additionally, the volatile memory may be distributed over multiple packages and/or located externally with respect to computer 1401.

Persistent storage 1413 is any form of non-volatile storage for computers that is now known or to be developed in the future. The non-volatility of this storage means that the stored data is maintained regardless of whether power is being supplied to computer 1401 and/or directly to persistent storage 1413. Persistent storage 1413 may be a read only memory (ROM), but typically at least a portion of the persistent storage allows writing of data, deletion of data and re-writing of data. Some familiar forms of persistent storage include magnetic disks and solid-state storage devices. Operating system 1422 may take several forms, such as various known proprietary operating systems or open source Portable Operating System Interface type operating systems that employ a kernel. The code included in block 1426 typically includes at least some of the computer code involved in performing the inventive methods.

Peripheral device set 1414 includes the set of peripheral devices of computer 1401. Data communication connections between the peripheral devices and the other components of computer 1401 may be implemented in various ways, such as Bluetooth connections, Near-Field Communication (NFC) connections, connections made by cables (such as universal serial bus (USB) type cables), insertion type connections (for example, secure digital (SD) card), connections made though local area communication networks and even connections made through wide area networks such as the internet. In various embodiments, UI device set 1423 may include components such as a display screen, speaker, microphone, wearable devices (such as goggles and smart watches), keyboard, mouse, printer, touchpad, game controllers, and haptic devices. Storage 1424 is external storage, such as an external hard drive, or insertable storage, such as an SD card. Storage 1424 may be persistent and/or volatile. In some embodiments, storage 1424 may take the form of a quantum computing storage device for storing data in the form of qubits. In embodiments where computer 1401 is required to have a large amount of storage (for example, where computer 1401 locally stores and manages a large database) then this storage may be provided by peripheral storage devices designed for storing very large amounts of data, such as a storage area network (SAN) that is shared by multiple, geographically distributed computers. IoT sensor set 1425 is made up of sensors that can be used in Internet of Things applications. For example, one sensor may be a thermometer and another sensor may be a motion detector.

Network module 1415 is the collection of computer software, hardware, and firmware that allows computer 1401 to communicate with other computers through WAN 1402. Network module 1415 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 1415 are performed on the same physical hardware device. In other embodiments (for example, embodiments that utilize software-defined networking (SDN)), the control functions and the forwarding functions of network module 1415 are performed on physically separate devices, such that the control functions manage several different network hardware devices. Computer readable program instructions for performing the inventive methods can typically be downloaded to computer 1401 from an external computer or external storage device through a network adapter card or network interface included in network module 1415.

WAN 1402 is any wide area network (for example, the internet) capable of communicating computer data over non-local distances by any technology for communicating computer data, now known or to be developed in the future. In some embodiments, the WAN may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

End user device (EUD) 1403 is any computer system that is used and controlled by an end user (for example, a customer of an enterprise that operates computer 1401), and may take any of the forms discussed above in connection with computer 1401. EUD 1403 typically receives helpful and useful data from the operations of computer 1401. For example, in a hypothetical case where computer 1401 is designed to provide a recommendation to an end user, this recommendation would typically be communicated from network module 1415 of computer 1401 through WAN 1402 to EUD 1403. In this way, EUD 1403 can display, or otherwise present, the recommendation to an end user. In some embodiments, EUD 1403 may be a client device, such as thin client, heavy client, mainframe computer, desktop computer and so on.

Remote server 1404 is any computer system that serves at least some data and/or functionality to computer 1401. Remote server 1404 may be controlled and used by the same entity that operates computer 1401. Remote server 1404 represents the machine(s) that collect and store helpful and useful data for use by other computers, such as computer 1401. For example, in a hypothetical case where computer 1401 is designed and programmed to provide a recommendation based on historical data, then this historical data may be provided to computer 1401 from remote database 1430 of remote server 1404.

Public cloud 1405 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 1405 is performed by the computer hardware and/or software of cloud orchestration module 1441. The computing resources provided by public cloud 1405 are typically implemented by virtual computing environments that run on various computers making up the computers of host physical machine set 1442, which is the universe of physical computers in and/or available to public cloud 1405. The virtual computing environments (VCEs) typically take the form of virtual machines from virtual machine set 1443 and/or containers from container set 1444. It is understood that these VCEs may be stored as images and may be transferred among and between the various physical machine hosts, either as images or after instantiation of the VCE. Cloud orchestration module 1441 manages the transfer and storage of images, deploys new instantiations of VCEs and manages active instantiations of VCE deployments. Gateway 1440 is the collection of computer software, hardware, and firmware that allows public cloud 1405 to communicate through WAN 1402.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

Private cloud 1406 is similar to public cloud 1405, except that the computing resources are only available for use by a single enterprise. While private cloud 1406 is depicted as being in communication with WAN 1402, in other embodiments a private cloud may be disconnected from the internet entirely and only accessible through a local/private network.

A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 1405 and private cloud 1406 are both part of a larger hybrid cloud.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A device, comprising:

a first data quantum bit;

a first quantum bit coupler which is coupled to the first data quantum bit;

a second quantum bit coupler which is coupled to the first quantum bit coupler; and an auxiliary quantum bit which is coupled to the second quantum bit coupler;

wherein the first quantum bit coupler is configured to operate in a state to suppress interaction between the first data quantum bit and the auxiliary quantum bit; and wherein the first quantum bit coupler and the second quantum bit coupler are each configured to operate in a respective state to enable interaction between the first data quantum bit and the auxiliary quantum bit and entangle a state of the first data quantum bit with a state of the auxiliary quantum bit.

2. The device of claim 1, wherein the first data quantum bit and the auxiliary quantum bit each comprise a transmon quantum bit.

3. The device of claim 1, further comprising:

a second data quantum bit; and a third quantum bit coupler which is coupled to the second data quantum bit and to the second quantum bit coupler;

wherein the third quantum bit coupler is configured to operate in a state to suppress interaction between the second data quantum bit and the first data quantum bit and to suppress interaction between the second data quantum bit and the auxiliary quantum bit; and wherein the third quantum bit coupler and the second quantum bit coupler are each configured to operate in a respective state to enable interaction between the second data quantum bit and the auxiliary quantum bit and entangle a state of the second data quantum bit with the state of the auxiliary quantum bit.

4. The device of claim 3, further comprising:

a capacitive bus which is configured to capacitively couple the first quantum bit coupler and the third quantum bit coupler to the second quantum bit coupler, wherein the capacitive bus comprises:

a first capacitor pad connected to the first quantum bit coupler by a first transmission line;

a second capacitor pad connected to the second quantum bit coupler by a second transmission line; and a third capacitor pad connected to the third quantum bit coupler by a third transmission line;

wherein the first capacitor pad and the third capacitor pad are disposed adjacent to a first edge and a second edge, respectively, of the second capacitor pad, and wherein the second capacitor pad has a size which is greater than a size of the first capacitor pad and a size of the third capacitor pad.

5. The device of claim 1, wherein the first quantum bit coupler and the second quantum bit coupler each comprise a flux-tunable transmon quantum bit.

6. The device of claim 1, wherein the auxiliary quantum bit comprises a quadrupole transmon quantum bit.

7. The device of claim 1, wherein:

the first quantum bit coupler comprises a first multimode quantum bit which comprises a first mode and a second mode;

the second quantum bit coupler comprises a second multimode quantum bit which comprises a first mode and a second mode.

8. The device of claim 7, wherein:

the first data quantum bit is capacitively coupled to the first mode of the first multimode quantum bit;

the auxiliary quantum bit is capacitively coupled to the first mode of the second multimode quantum bit;

the second mode of the first multimode quantum bit is capacitively coupled to the second mode of the second multimode quantum bit;

the first quantum bit coupler is configured to operate in state in which the first data quantum bit is exchange-coupled to only the first mode of the first multimode quantum bit;

the first quantum bit coupler is configured to operate in state in which the first data quantum bit is exchange-coupled to both the first mode and the second mode of the first multimode quantum bit;

the second quantum bit coupler is configured to operate in state in which the auxiliary quantum bit is exchange-coupled to only the first mode of the second multimode quantum bit; and the second quantum bit coupler is configured to operate in state in which the auxiliary quantum bit is exchange-coupled to both the first mode and the second mode of the second multimode quantum bit.

9. A system, comprising;

a quantum processor comprising an array of quantum bits; and a control system configured to generate control signals to control the quantum processor;

wherein the array of quantum bits comprises:

a first data quantum bit;

a first quantum bit coupler which is coupled to the first data quantum bit;

a second quantum bit coupler which is coupled to the first quantum bit coupler; and an auxiliary quantum bit which is coupled to the second quantum bit coupler;

wherein the first quantum bit coupler is configured to operate in a state to suppress interaction between the first data quantum bit and the auxiliary quantum bit; and wherein the first quantum bit coupler and the second quantum bit coupler are each configured to operate in a respective state to enable interaction between the first data quantum bit and the auxiliary quantum bit and entangle a state of the first data quantum bit with a state of the auxiliary quantum bit.

10. The system of claim 9, wherein the first data quantum bit and the auxiliary quantum bit each comprise a transmon quantum bit.

11. The system of claim 9, wherein the array of quantum bits further comprises:

a second data quantum bit; and a third quantum bit coupler which is coupled to the second data quantum bit and to the second quantum bit coupler;

wherein the third quantum bit coupler is configured to operate in a state to suppress interaction between the second data quantum bit and the first data quantum bit and to suppress interaction between the second data quantum bit and the auxiliary quantum bit; and wherein the third quantum bit coupler and the second quantum bit coupler are each configured to operate in a respective state to enable interaction between the second data quantum bit and the auxiliary quantum bit and entangle a state of the second data quantum bit with the state of the auxiliary quantum bit.

12. The system of claim 11, further comprising:

a capacitive bus which is configured to capacitively couple the first quantum bit coupler and third quantum bit coupler to the second quantum bit coupler, wherein the capacitive bus comprises:

a first capacitor pad connected to the first quantum bit coupler by a first transmission line;

a second capacitor pad connected to the second quantum bit coupler by a second transmission line; and a third capacitor pad connected to the third quantum bit coupler by a third transmission line;

wherein the first capacitor pad and the third capacitor pad are disposed adjacent to a first edge and a second edge, respectively, of the second capacitor pad, and wherein the second capacitor pad has a size which is greater than a size of the first capacitor pad and a size of the third capacitor pad.

13. The system of claim 9, wherein the first quantum bit coupler and the second quantum bit coupler each comprise a flux-tunable transmon quantum bit.

14. The system of claim 9, wherein the auxiliary quantum bit comprises a quadrupole transmon quantum bit.

15. The system of claim 9, wherein:

the first quantum bit coupler comprises a first multimode quantum bit which comprises a first mode and a second mode; and the second quantum bit coupler comprises a second multimode quantum bit which comprises a first mode and a second mode.

16. The system of claim 15, wherein:

the first data quantum bit is capacitively coupled to the first mode of the first multimode quantum bit;

the auxiliary quantum bit is capacitively coupled to the first mode of the second multimode quantum bit;

the second mode of the first multimode quantum bit is capacitively coupled to the second mode of the second multimode quantum bit;

the first quantum bit coupler is configured to operate in state in which the first data quantum bit is exchange-coupled to only the first mode of the first multimode quantum bit;

the first quantum bit coupler is configured to operate in state in which the first data quantum bit is exchange-coupled to both the first mode and the second mode of the first multimode quantum bit;

the second quantum bit coupler is configured to operate in state in which the auxiliary quantum bit is exchange-coupled to only the first mode of the second multimode quantum bit; and the second quantum bit coupler is configured to operate in state in which the auxiliary quantum bit is exchange-coupled to both the first mode and the second mode of the second multimode quantum bit.

17. A device, comprising:

a data quantum bit;

a quantum bit coupler which is coupled to the data quantum bit;

a transmission line resonator which is coupled to the quantum bit coupler; and an auxiliary quantum bit which is coupled to the transmission line resonator;

wherein the quantum bit coupler is configured to operate in a state to suppress interaction between the data quantum bit and the auxiliary quantum bit; and wherein the quantum bit coupler is configured to operate in a state to enable interaction between the data quantum bit and the auxiliary quantum bit, through the quantum bit coupler and the transmission line resonator, to entangle a state of the data quantum bit with a state of the auxiliary quantum bit.

18. The device of claim 17, wherein the data quantum bit and the auxiliary quantum bit each comprise a transmon quantum bit.

19. The device of claim 17, wherein:

the quantum bit coupler comprises a multimode quantum bit which comprises a first mode and a second mode;

the data quantum bit is capacitively coupled to the first mode of the multimode quantum bit;

the transmission line resonator is capacitively coupled to the second mode of the multimode quantum bit;

the quantum bit coupler is configured to operate in state in which the data quantum bit is exchange-coupled to only the first mode of the multimode quantum bit; and the quantum bit coupler is configured to operate in state in which the data quantum bit is exchange-coupled to both the first mode and the second mode of the multimode quantum bit.

20. A system, comprising;

a quantum processor comprising an array of quantum bits; and a control system configured to generate control signals to control the quantum processor;

wherein the array of quantum bits comprises:

a data quantum bit;

a quantum bit coupler which is coupled to the data quantum bit;

a transmission line resonator which is coupled to the quantum bit coupler; and an auxiliary quantum bit which is coupled to the transmission line resonator;

wherein the quantum bit coupler is configured to operate in a state to suppress interaction between the data quantum bit and the auxiliary quantum bit; and wherein the quantum bit coupler is configured to operate in a state to enable interaction between the data quantum bit and the auxiliary quantum bit, through the quantum bit coupler and the transmission line resonator, to entangle a state of the data quantum bit with a state of the auxiliary quantum bit.

21. The system of claim 20, wherein the data quantum bit and the auxiliary quantum bit each comprise a transmon quantum bit.

22. The system of claim 20, wherein:

the quantum bit coupler comprises a multimode quantum bit which comprises a first mode and a second mode;

the data quantum bit is capacitively coupled to the first mode of the multimode quantum bit;

the transmission line resonator is capacitively coupled to the second mode of the multimode quantum bit;

the quantum bit coupler is configured to operate in state in which the data quantum bit is exchange-coupled to only the first mode of the multimode quantum bit; and the quantum bit coupler is configured to operate in state in which the data quantum bit is exchange-coupled to both the first mode and the second mode of the multimode quantum bit.

23. A method, comprising:

initializing a state of an auxiliary quantum bit;

placing a first quantum bit coupler, which is coupled to the auxiliary quantum bit, into an activated state;

placing a second quantum bit coupler, which is coupled to a data quantum bit, into an activated state to enable interaction between the data quantum bit and the auxiliary quantum bit and entangle a state of the data quantum bit with a state of the auxiliary quantum bit through the first and second quantum bit couplers in the their respective activated states;

placing each of the first quantum bit coupler and the second quantum bit coupler into a deactivated state;

reading the state of the auxiliary quantum bit, subsequent to each of the first quantum bit coupler and the second quantum bit coupler being placed into the deactivated state; and determining a presence of a quantum error based on the readout a read out state of the auxiliary quantum bit.

24. The method of claim 23, wherein:

placing the first quantum bit coupler into the activated state comprises applying a first flux control signal to a first superconducting loop of a first superconducting quantum interference device of the first quantum bit coupler to configure the first quantum bit coupler from the deactivated state to the activated state; and placing the second quantum bit coupler into the activated state comprises applying a second flux control signal to a second superconducting loop of a second superconducting quantum interference device of the second quantum bit coupler to configure the second quantum bit coupler from the deactivated state to the activated state.

25. The method of claim 23, wherein:

the first quantum bit coupler comprises a first multimode quantum bit which comprises a first mode and a second mode;

the second quantum bit coupler comprises a second multimode quantum bit which comprises a first mode and a second mode;

the auxiliary quantum bit is capacitively coupled to the first mode of the first multimode quantum bit;

the data quantum bit is capacitively coupled to the first mode of the second multimode quantum bit;

the second mode of the first multimode quantum bit is capacitively coupled to the second mode of the second multimode quantum bit;

placing the first quantum bit coupler into the activated state comprises to applying a first flux control signal to a first superconducting loop of a first superconducting quantum interference device of the first multimode quantum bit to exchange couple the auxiliary quantum bit to both the first mode and the second mode of the first multimode quantum bit; and placing the second quantum bit coupler into the activated state comprises applying a second flux control signal to a second superconducting loop of a second superconducting quantum interference device of the second multimode quantum bit to exchange couple the data quantum bit to both the first mode and the second mode of the second multimode quantum bit.

* * * * *